US012732458B2

(12) United States Patent
Dong et al.

(10) Patent No.: US 12,732,458 B2
(45) Date of Patent: Sep. 8, 2026

(54) PACKET PROCESSING METHOD, APPARATUS, AND SYSTEM

(71) Applicant: Huawei Technologies Co., Ltd., Shenzhen (CN)

(72) Inventors: Jie Dong, Beijing (CN); Haibo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 18/654,369

(22) Filed: May 3, 2024

(65) Prior Publication Data

US 2024/0283738 A1 Aug. 22, 2024

Related U.S. Application Data

(63) Continuation of application No. PCT/CN2022/127833, filed on Oct. 27, 2022.

(30) Foreign Application Priority Data

Nov. 4, 2021 (CN) ......................... 202111300903.8
Dec. 17, 2021 (CN) ......................... 202111554313.8
Mar. 18, 2022 (CN) ......................... 202210270403.2

(51) Int. Cl.
*H04L 45/00* (2022.01)
*H04L 45/24* (2022.01)
*H04L 45/741* (2022.01)

(52) U.S. Cl.
CPC ............ *H04L 45/566* (2013.01); *H04L 45/24* (2013.01); *H04L 45/741* (2013.01)

(58) Field of Classification Search
CPC ...... H04L 45/566; H04L 45/24; H04L 45/741
See application file for complete search history.

(56) References Cited

U.S. PATENT DOCUMENTS

2015/0109902 A1* 4/2015 Kumar .................... H04L 45/28 370/219
2017/0045280 A1 2/2017 Boarman et al.
2018/0014205 A1 1/2018 Tsai et al.
2018/0192422 A1 7/2018 Yi et al.
(Continued)

FOREIGN PATENT DOCUMENTS

CN 112491718 A * 3/2021 ............. H04L 45/34
CN 113055289 A 6/2021

OTHER PUBLICATIONS

D. Dhody et al, "PCEP Extension for Flow Specification draft-ietf-pce-pcep-flowspec-13," Oct. 14, 2021, total 28 pages.
(Continued)

*Primary Examiner* — Joseph G Ustaris
(74) *Attorney, Agent, or Firm* — Conley Rose, P.C.

(57) ABSTRACT

A packet processing method includes a first device that obtains a forwarding entry, where the forwarding entry includes a match entry and an action entry, and the match entry includes an identifier of one or more extension packet headers. The first device receives a first packet. The first device determines that the first packet includes an extension packet header that matches the match entry. The first device processes the first packet based on the action entry in response to determining that the first packet includes the extension packet header that matches the match entry.

20 Claims, 8 Drawing Sheets

(56) References Cited

U.S. PATENT DOCUMENTS

| | | | |
|---|---|---|---|
| 2018/0199342 | A1 | 7/2018 | Rai et al. |
| 2018/0205565 | A1* | 7/2018 | Wijnands ................ H04L 12/18 |
| 2019/0140947 | A1* | 5/2019 | Zhuang ................. H04L 45/306 |
| 2023/0370298 | A1 | 11/2023 | Zhu et al. |

OTHER PUBLICATIONS

S. Deering et al, "Internet Protocol, Version 6 (IPv6) Specification," RFC 8200, Jul. 2017, total 42 pages.
C. Loibl et al, "Dissemination of Flow Specification Rules for IPV6", RFC 8956, Dec. 2020, total 19 pages.
C. Loibl et al, "Dissemination of Flow Specification Rules", RFC 8955, Dec. 2020, total 36 pages.
Filsfils C et al "Segment Routing over IPv6 (SRv6) Network Programming; rfc 8986", Feb. 22, 2021 (Feb. 22, 2021), pp. 1-24, XP015146191.
Filsfils C et al "RFC 8754 IPV6 Segment Routing Header (SRH)", Mar. 1, 2020 (Mar. 1, 2020), pp. 1-27, XP093238564.
Liu China Mobile Y Gu Huawei Wjy: "Traffic Steering using BGP Flowspec with SRv6 Policy; draft-jiang-idr-ts-flowspec-srv6-policy-00.txt", Jul. 13, 2020 (Jul. 13, 2020), pp. 1-8, XP015140769.
S. Cheshire, et al., "DNS-Based Service Discovery," RFC 6763, Feb. 2013, 49 pages.

* cited by examiner

| Address Family Information (3 bytes) |
|---|
| Next Hop Network Address Information (variable length) |
| Network Layer Reachable Information (variable length) |

PACKET PROCESSING METHOD, APPARATUS, AND SYSTEM

CROSS-REFERENCE TO RELATED APPLICATIONS

This is a continuation of International Patent Application No. PCT/CN2022/127833 filed on Oct. 27, 2022, which claims priority to Chinese Patent Application No. 202210270403.2 filed on Mar. 18, 2022, Chinese Patent Application No. 202111554313.8 filed on Dec. 17, 2021, and Chinese Patent Application No. 202111300903.8 filed on Nov. 4, 2021. All of the aforementioned patent applications are hereby incorporated by reference in their entireties.

TECHNICAL FIELD

This application relates to the field of communications technologies, and in particular, to a packet processing method, apparatus, and system.

BACKGROUND

In Internet Protocol (IP) version 6 (IPv6) technologies, a packet header of a packet may include a basic packet header and an extension packet header. An IPv6 packet may include a basic packet header and one or more extension packet headers. The basic packet header may be used for carrying basic information of the IPv6 packet, for example, a destination address and a source address of the packet. The extension packet header may be used for carrying extension information of the IPv6 packet.

However, there are a number of types of extension packet headers. Some network devices in a network system do not have a capability of processing an extension packet header. Because these network devices do not have a capability of processing an extension packet header, these network devices may directly discard these packets including an extension packet header. As a result, a packet loss occurs in a process of packet forwarding, and reliability of packet forwarding is reduced.

SUMMARY

This application provides a packet processing method, apparatus, and system, to flexibly control processing of a packet with an extension packet header, so that reliability and flexibility of packet forwarding are improved.

According to a first aspect, this application provides a packet processing method. The method may be applied to a first device. The first device may be a network device configured to forward a data packet, for example, may be a device such as a router or a switch. The packet processing method may include the following. The first device obtains a forwarding entry first, for example, may establish a forwarding entry or receive a forwarding entry sent by another device. The forwarding entry includes a match entry and an action entry, where the match entry includes an identifier of one or more extension packet headers, and is used for defining an extension packet header of a processed packet. In a process of forwarding a data packet, the first device may determine whether a forwarded packet matches the match entry. If a first packet forwarded by the first device includes an extension packet header that matches the match entry, the first device determines that the first packet meets the match entry. For a first packet header that meets the match entry, the first device may process the first packet based on the action entry. In other words, before forwarding the first packet, the first device may determine whether the extension packet header included in the first packet matches the match entry of the forwarding entry. If the identifier of the extension packet header included in the first packet matches the match entry, the packet is processed based on the action entry of the forwarding entry, so that a manner of flexibly controlling processing of a packet carrying an extension packet header is provided. For example, a packet carrying an extension packet header may be forwarded through a specified path, and all devices on the specified path have a capability of processing an extension packet header. Alternatively, one or more network devices specified on a first forwarding path have a capability of processing the first packet. In other words, the first forwarding path may include a network device that has a capability of processing the extension packet header included in the first packet, and the remaining network devices on the first forwarding path do not need to process the extension packet header included in the first packet. In this way, the first packet can be kept from being forwarded to a network device that does not have a capability of processing an extension packet header, to avoid discarding of the first packet, so that reliability and flexibility of packet forwarding are improved.

In a possible design, the match entry includes a first packet header information set, and the first packet header information set may include an identifier of one or more extension packet headers. The extension packet header included in the first packet that meets the match entry may match the first packet header information set. In a process of determining whether the first packet meets the match entry, the first device may determine whether a second packet header information set and the first packet header information set meet a match condition, where the second packet header information set includes an identifier of one or more extension packet headers included in the first packet. If the second packet header information set and the first packet header information set meet the match condition, the first device determines that the first packet is a packet that meets the match condition.

In a possible design, the match condition may be any one or more of a match-all condition, a match-any condition, and an exclude match condition.

In a first possible implementation, the match condition is a match-all condition, and that the second packet header information set and the first packet header information set meet the match condition includes the following. The second packet header information set includes identifiers of all extension packet headers in the first packet header information set. In other words, if the first device determines that the first packet header information set is a subset of the second packet header information set, the first device may determine that the first packet is a packet that meets the match condition, and the first packet includes an extension packet header that matches the match entry.

In a second possible implementation, the match condition is a match-any condition, and that the second packet header information set and the first packet header information set meet the match condition includes the following. The second packet header information set includes an identifier of any one or more extension packet headers in the first packet header information set. In other words, if the first device determines that an intersection exists between the first packet header information set and the second packet header information set, the first device may determine that the first packet is a packet that meets the match condition, and the first packet includes an extension packet header that matches the match entry.

In a third possible implementation, the match condition is an exclude match condition, and that the second packet header information set and the first packet header information set meet the match condition includes the following. The second packet header information set does not include an identifier of any one or more extension packet headers in the first packet header information set. In other words, if the first device determines that no intersection exists between the first packet header information set and the second packet header information set, the first device may determine that the first packet is a packet that meets the match condition, and the first packet includes an extension packet header that matches the match entry.

In a possible design, the match condition may be alternatively another condition other than the foregoing three match conditions, and is used for matching a specific field in a specific packet header of a packet. The first packet header information set may include an identifier of a first extension packet header and an identifier of a first field. Correspondingly, that the second packet header information set and the first packet header information set meet the match condition may include the following. The second packet header information set includes the identifier of the first extension packet header and the identifier of the first field. If the second packet header information set includes the identifier of the first extension packet header and the identifier of the first field, it indicates that the first packet includes the first extension packet header, and the first extension packet header of the first packet includes the first field, to meet a requirement of the match entry.

In a possible design, the match entry may be further used for matching a specific value of a specific field in a specific packet header of a packet. The first packet header information set may include an identifier of a second extension packet header, an identifier of a second field, and a first value. Correspondingly, that the second packet header information set and the first packet header information set meet the match condition may include the following. The second packet header information set includes the identifier of the second extension packet header, the identifier of the second field, and a first value. If the second packet header information set includes the identifier of the second extension packet header, the identifier of the second field, and the first value, it indicates that the first packet includes the second extension packet header, and a value of the second field in the second extension packet header of the first packet is the first value, to meet the requirement of the match entry.

In a possible design, the action entry is used for indicating a first network device to forward the first packet based on a specific forwarding path. Further, after determining that the first packet includes the extension packet header that matches the match entry, the first device may determine, based on the action entry, a first forwarding path corresponding to the first packet, and send the first packet through the first forwarding path. Any network device on the first forwarding path has a capability of processing the extension packet header included in the first packet. Alternatively, one or more network devices specified on the first forwarding path have a capability of processing the first packet. In other words, the first forwarding path may include a network device that has a capability of processing the extension packet header included in the first packet, and the remaining network devices on the first forwarding path do not need to process the extension packet header included in the first packet. In this way, reliability of packet forwarding is improved by adjusting a forwarding path of the first packet.

In a possible design, the action entry is used for indicating the first device to encapsulate a specific packet header into the first packet. Further, the first device encapsulates an outer packet header into the first packet to obtain the second packet. For example, the first device may encapsulate the first packet as a payload into the second packet. A destination address of the outer packet header is a destination address of the first packet, or a destination address of the outer packet header is an address of an $N^{th}$ last hop network device of a destination device of the first packet (N is a positive integer), and a source address of the outer packet header is an address of the first device. After obtaining the second packet through encapsulation, the first device sends the second packet through a second forwarding path. A second forwarding path may include a network device that does not have a capability of processing the extension packet header included in the first packet. In other words, the outer packet header is encapsulated into the first packet, and a network device that transmits the second packet does not parse the extension packet header included in the first packet. In this way, even if the network device that does not have a capability of parsing the extension packet header included in the first packet is located on a forwarding path of the second packet, because the second packet includes the outer packet header, the network device does not need to parse the extension packet header included in the first packet, and the second packet is not discarded by the network device, so that reliability of packet forwarding is improved.

In a possible design, the outer packet header may further include a first identifier, and the first identifier may be used by a device on the second forwarding path to determine that an extension packet header included in the second packet does not need to be processed. The first identifier is used for triggering a device on the second forwarding path to determine, based on the first identifier, that the extension packet header included in the second packet does not need to be parsed. Therefore, the network device on the second forwarding path is kept from parsing the extension packet header included in the first packet in the second packet, and discarding of the second packet is avoided.

In a possible design, the first identifier is carried by using a next header field in the outer packet header of the second packet. The device on the second forwarding path determines, based on the next header field included in the outer packet header, that the extension packet header included in the second packet does not need to be parsed. For example, when a value of the next header field is 41, it indicates that an IPv6 packet is encapsulated in the outer packet header of the second packet, in other words, the extension packet header included in the second packet is used as payload information and does not need to be processed by the network device.

In a possible design, the forwarding entry is generated by the first device based on a notification message sent by a second device. The second device may be a network device other than the first device in a network system, or may be a control device. The notification message may include a flow specification (Flowspec) field, and the FlowSpec field of the notification message may include the match entry and the action entry. Correspondingly, the first device generates the forwarding entry based on the notification message.

In a possible design, the extension packet header may include any one or more of an IPv6 extension packet header, a Multi-Protocol Label Switching (MPLS) extension header, and an IP version 4 (IPv4) packet header including an IPv4 option field. Optionally, the MPLS extension header may also be referred to as MPLS ancillary data.

According to a second aspect, this application provides a packet processing method. The method may be applied to a second device. The second device may be a control device configured to control a network device in a network system, for example, may be a device such as a controller. The packet processing method further includes the following. The second device generates a notification message, where the notification message includes a match entry and an action entry. The match entry may include an identifier of one or more extension packet headers, and the action entry is used for controlling the network device to process a packet. Then, the second device sends the notification message to a first device. After receiving the notification message, the first device may process, based on the action entry included in the notification message, a packet including an extension packet header that matches the match entry, so that a manner of flexibly controlling processing of a packet carrying an extension packet header is provided. For example, a packet carrying an extension packet header may be forwarded through a specified path, and all devices on the specified path have a capability of processing an extension packet header. In this way, a first packet can be kept from being forwarded to a network device that does not have a capability of processing an extension packet header, to avoid discarding of the first packet, so that reliability and flexibility of packet forwarding are improved.

In a possible design, the notification message is used by the first device to generate a forwarding entry, and the forwarding entry includes a correspondence between the match entry and the action entry.

In a possible design, the notification message is a Border Gateway Protocol (BGP) update message. In this case, the match entry may be carried in a network layer reachability information (NLRI) field corresponding to a BGP Flowspec of the notification message.

In a possible design, if the notification message is a BGP update message, the action entry may be carried in the NLRI field or a route attribute information field of the notification message. Optionally, the action entry may be carried in an IPv6 address-related extended community attribute (extended community) field or a wide community attribute (wide community) field of the notification message.

In a possible design, network devices in the network system controlled by the second device are connected based on a Path Computation Element Communication Protocol (PCEP). In this case, the notification message may be any one of a path computation initiate (PCInitiate) message, a path computation update (PCUpd) message, and a path computation reply (PCRep) message.

In a possible design, if the network devices in the network system are connected based on the PCEP, the match entry may be carried in a flow filter type-length-value (TLV) field of the notification message.

In a possible design, an extension packet header included in the match entry may include any one or more of an IPv6 extension packet header, an MPLS extension header, and an IPv4 packet header including an IPv4 option field. Optionally, the MPLS extension header may also be referred to as MPLS ancillary data.

According to a third aspect, this application provides a packet processing method. The method is applied to a first device. The first device is a network device configured to forward a data packet, for example, may be a device such as a router or a switch. Further, the packet processing method includes the following. The first device acquires a notification message, where the notification message may include a match entry and an action entry, the match entry includes an identifier of one or more extension packet headers, and the action entry may be used for indicating the first device to process a packet including an extension packet header that matches the match entry. Next, the first device generates a forwarding entry based on the notification message, where the forwarding entry may include a correspondence between the action entry and the match entry. In this way, after receiving a packet, the first device may determine, based on the forwarding entry, whether the packet includes an extension packet header that matches the match entry. If the packet includes an extension packet header that matches the match entry, the first device processes the packet based on the action entry. In this way, if an identifier of an extension packet header included in a first packet matches the match entry, the packet is processed based on the action entry of the forwarding entry, so that a manner of flexibly controlling processing of a packet carrying an extension packet header is provided.

In a possible design, the notification message is sent by a second device. The second device may be a control device such as a controller, or may be another network device in a network system.

In a possible design, the notification message is a BGP update message. In this case, the match entry may be carried in an NLRI field corresponding to a BGP Flowspec in the notification message.

In a possible design, if the notification message is a BGP update message, the action entry may be carried in the NLRI field or a route attribute information field of the notification message. Optionally, the action entry may be carried in an IPv6 address-related extended community attribute field or a wide community attribute field of the notification message.

In a possible design, network devices in the network system controlled by the second device are connected based on a PCEP. In this case, the notification message may be any one of a PCInitiate message, a PCUpd message, and a PCRep message.

In a possible design, if the network devices in the network system are connected based on the PCEP, the match entry may be carried in a flow filter TLV field of the notification message.

In a possible design, an extension packet header included in the match entry may include any one or more of an IPv6 extension packet header, an MPLS extension header, and an IPv4 packet header including an IPv4 option field. Optionally, the MPLS extension header may also be referred to as MPLS ancillary data.

According to a fourth aspect, this application provides a packet processing apparatus. The apparatus is used in a first device, and the first device is configured to perform the method in any one of the first aspect, the possible designs of the first aspect, the third aspect, or the possible designs of the third aspect. Further, the first network device includes units configured to perform the method in any one of the first aspect or the possible designs of the first aspect, or the first network device includes units configured to perform the method in any one of the third aspect or the possible designs of the third aspect.

According to a fifth aspect, this application provides a packet processing apparatus. The apparatus is used in a second device, and the second device is configured to perform the method according to any one of the second aspect or the possible designs of the second aspect. Further, the second network device includes units configured to perform the method according to any one of the second aspect or the possible designs of the second aspect.

According to a sixth aspect, this application provides a packet processing system. The packet processing system includes a first device and a second device. The first device is configured to perform the method according to any one of the first aspect, the possible designs of the first aspect, the third aspect, or the possible designs of the third aspect. The second device is configured to perform the method according to any one of the second aspect or the possible designs of the second aspect.

According to a seventh aspect, this application provides a first device. The first device includes a processor and a memory. The memory is configured to store instructions or program code. The processor is configured to invoke and run the instructions or the program code from the memory, to perform the packet processing method according to the first aspect or the third aspect.

According to an eighth aspect, this application provides a second device. The second device includes a processor and a memory. The memory is configured to store instructions or program code. The processor is configured to invoke and run the instructions or the program code from the memory, to perform the packet processing method according to the second aspect.

According to a ninth aspect, this application provides a chip, including a memory and a processor. The memory is configured to store instructions or program code, and the processor is configured to invoke and run the instructions or the program code from the memory, to perform the packet processing method according to the first aspect, the second aspect, or the third aspect.

According to a tenth aspect, an embodiment of this application provides a computer-readable storage medium, including instructions, a program, or code. When the instructions, the program, or the code is executed on a computer, the computer is enabled to perform the packet processing method according to the first aspect, the second aspect, or the third aspect.

DESCRIPTION OF EMBODIMENTS

Figures 1A, 1B:
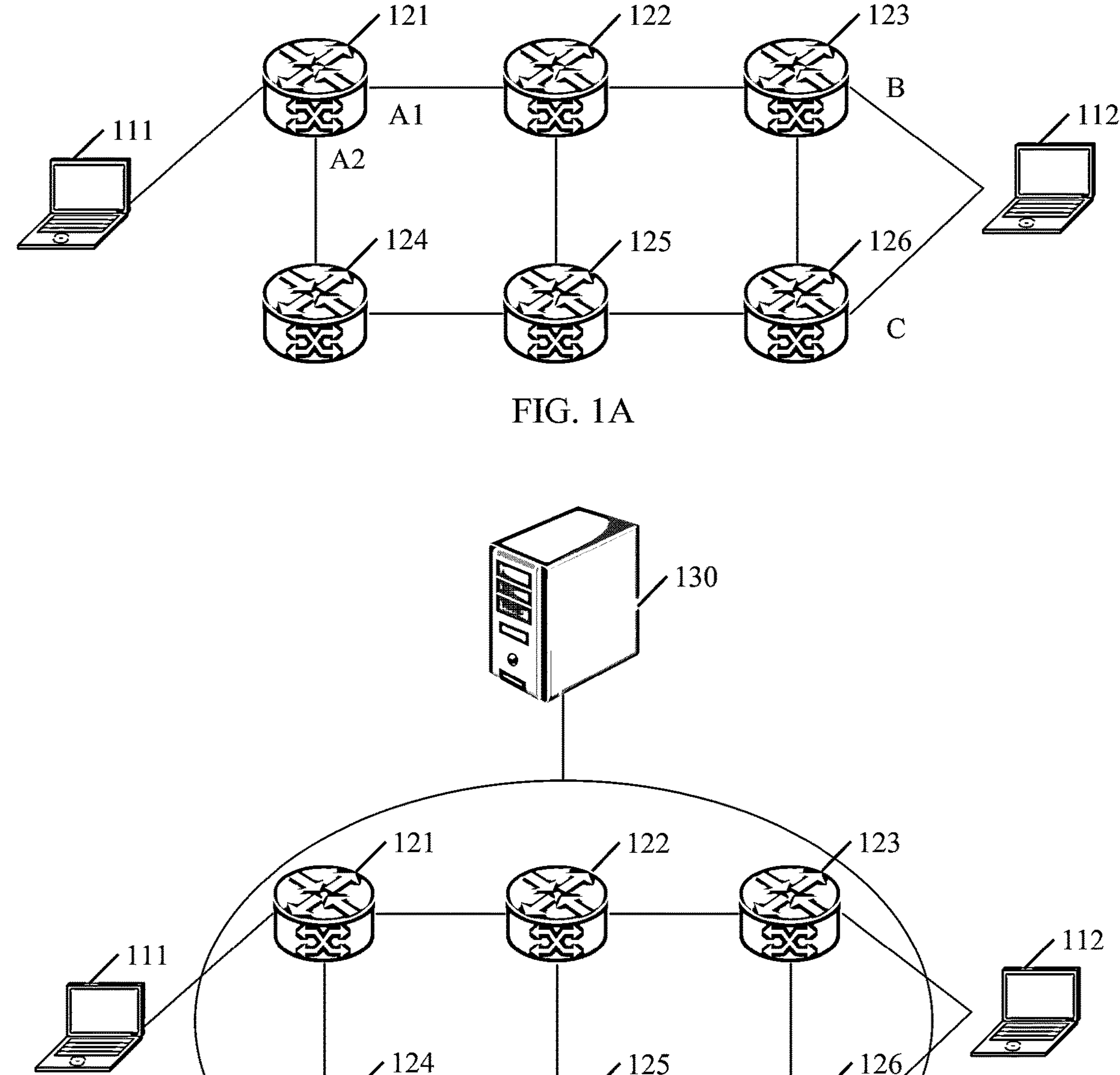
FIG. 1A is a diagram of a network structure of a network system according to an embodiment of this application.
FIG. 1B is a diagram of another network structure of a network system according to an embodiment of this application.

The following describes, with reference to the accompanying drawings, a packet processing method, apparatus, and system provided in embodiments of this application.

In an IPv6 technology, one IPv6 packet may include one or more extension packet headers, and each extension packet header may be used for carrying additional forwarding information, to indicate a network device on a forwarding path of the IPv6 packet to perform a corresponding forwarding operation. The extension packet header may be carried between a basic packet header of an IPv6 packet (basic IPv6 header) and an upper-layer protocol data unit. The upper-layer protocol data unit includes a payload part in the IPv6 packet. The basic packet header and the extension packet header may include a next header field which is used for indicating a type of a next header of a packet header. For example, it is assumed that one IPv6 packet includes N extension packet headers. In this case, a next header field of a basic packet header of the IPv6 packet may be used for indicating a type of a first extension packet header of the IPv6 packet. A next header field of an $i^{th}$ extension packet header of the IPv6 packet may be used for indicating a type of an $(i+1)^{th}$ extension packet header of the IPv6 packet, where i is a positive integer less than N. A next header field of an $N^{th}$ extension packet header of the IPv6 packet may be used for indicating that a next part of the $N^{th}$ extension packet header of the IPv6 packet is an upper-layer protocol data unit. In this way, one IPv6 packet can theoretically carry any quantity of extension packet headers, and support a plurality of different forwarding operations.

Optionally, to perform an operation corresponding to an extension packet header, a capability of processing an extension packet header may be configured on the network device, so that the network device can process a packet including an extension packet header. However, network devices in a network system may have different capabilities of supporting an extension packet header. For example, in the network system, some network devices may have a capability of processing an extension packet header, and some other network devices may not have a capability of processing an extension packet header. In this way, in a forwarding process, a packet including an extension packet header may be discarded by a network device that does not have a capability of processing an extension packet header, and as a result, a packet loss occurs in a service packet. It may be understood that, that the network device does not have a capability of processing an extension packet header may include that the network device does not have a capability of processing a specific extension packet header, or may include that the network device does not have a capability of processing any extension packet header.

Further, in one IPv6 technology, different network devices have a fixed capability of processing a same extension packet header. In other words, different network devices use a same method to process packets having a same extension packet header, and cannot flexibly process an extension packet header.

A description is made with reference to the accompanying drawings of the specification. FIG. 1A is a diagram of a network architecture according to an embodiment of this application. In FIG. 1A, a network system includes a device 111, a device 112, a network device 121, a network device 122, a network device 123, a network device 124, a network device 125, and a network device 126. The network device 121 is separately connected to the device 111, the network device 122, and the network device 124, the network device 123 is separately connected to the device 112, the network device 122, and the network device 126, and the device 112 is separately connected to the network device 123 and the network device 126. The device 111 may send a data packet to the device 112 through forwarding between the network devices in the network system. Further, the network device 121 may be connected to the network device 122 by a network interface A1, and connected to the network device 124 by a network interface A2.

It is assumed that the network device 121 and the network device 123 in FIG. 1A have a capability of processing an extension packet header M, and the network device 122 does not have a capability of processing the extension packet header M. In this case, the device 111 sends a packet including an extension packet header to the device 112, and the packet is transmitted through a forwarding path "network device 121→network device 122→network device 123". In this case, in a process of transmitting the packet, the network device 121 may process the packet, and send the packet to the network device 122 through the network interface A1. If the extension packet header of the packet includes the extension packet header M, because the network device 122 does not have a capability of processing the extension packet header M, the network device 122 cannot process the packet, and cannot continue to forward the packet. As a result, the packet is discarded, and reliability of packet forwarding is reduced.

The foregoing example is described by using an IPv6-based network system as an example. It may be understood that the foregoing problem also exists in another application scenario in which a packet includes an extension packet header. For example, in an MPLS protocol-based network system, the foregoing problem may also exist due to different capabilities of parsing an MPLS extension header by network devices. In an IPv4-based network system, if an IPv4 packet header of a packet includes an option field, and different values of the option field may correspond to different types of IPv4 packet headers, the IPv4-based network system also has the foregoing problem. In other words, the extension packet header mentioned in this embodiment of this application may be an extension packet header of an IPv6 protocol, or may be an MPLS extension header or an IPv4 Option packet header. Optionally, the MPLS extension header may also be referred to as MPLS ancillary data.

Embodiments of this application provide a packet processing method, apparatus, and system, to flexibly control processing of a packet with an extension packet header, so that reliability and flexibility of packet forwarding are improved.

The packet processing method provided in embodiments of this application may be applied to a network shown in FIG. 1A. Further, the packet processing method may be performed by any one or more network devices in the network device 121, the network device 122, the network device 123, the network device 124, the network device 125, and the network device 126 in the embodiment shown in FIG. 1A.

In embodiments of this application, the device 111 and the device 112 may be terminal devices, or may be devices such as a server or a database. The terminal device may be referred to as user equipment (UE), a mobile station (MS), a mobile terminal (MT), a terminal, or the like. The terminal device is a device that provides voice and/or data connectivity to a user, or a chip disposed in the device. For example, the terminal device may be a hand-held device or a vehicle-mounted device that has a wireless connection function. The terminal device may be a mobile phone, a desktop computer, a tablet computer, a notebook computer, a palmtop computer, a mobile Internet device (MID), a wearable device, a virtual reality (VR) device, an augmented reality (AR) device, a wireless terminal or a wired terminal in industrial control, a wireless terminal in self driving, a wireless terminal in remote medical surgery, a wireless terminal in a smart grid, a wireless terminal in transportation safety, a wireless terminal in a smart city, a wireless terminal in smart home, a residential gateway device that supports 5G access (5G→Residential Gateway or 5G→RG), or the like.

The network device may be a device having a forwarding function, for example, a forwarding device such as a router or a switch, or may be a device having a forwarding function such as a server or a terminal device. Optionally, the network device may be a provider edge (PE) device deployed at a network edge, for example, may be the network device 121, the network device 123, or the network device 126 in FIG. 1A, or may be a provider (P) device deployed inside a network, for example, may be the network device 122, the network device 124, or the network device 125 in FIG. 1A.

It may be understood that a part of processing a packet in the packet processing method may be performed by a forwarding plane of the network device, for example, may be performed by a forwarding chip of the network device. A part of generating a forwarding entry in the packet processing method may be performed by a control plane of the network device, for example, may be performed by a processor of the network device. The processor may be a central processing unit (CPU) of the network device. Optionally, in some other possible implementations, the packet processing method may be alternatively performed by an independent control plane device. For example, in an application scenario such as a virtualized network function (VNF), the forwarding entry described below may be generated by a server or a controller that is used as a control plane device, and sent to a network device that is used as a forwarding plane device, so that the network device processes a packet based on the forwarding entry.

In the packet processing method provided in embodiments of this application, a part of generating and sending a notification message may be performed by a control device. The control device may be configured to control one or more network devices in a network system. The control device may be a server or another computer device having a data processing capability. For example, the packet processing method provided in embodiments of this application may be a control device 130 shown in FIG. 1B. The control device 130 shown in FIG. 1B may be separately connected to the network device 121, the network device 122, the network device 123, the network device 124, the network device 125, and the network device 126. Optionally, the control device may be a server or a controller.

Figures 2, 3:
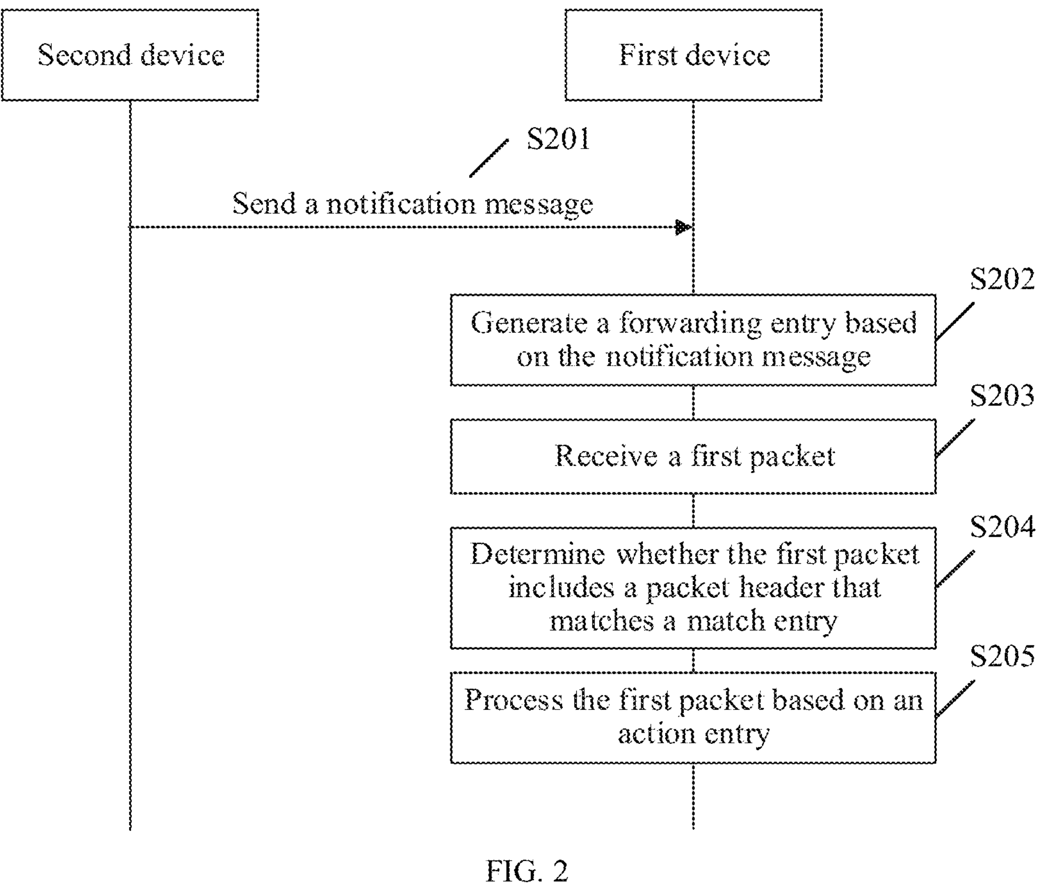
FIG. 2 is a diagram of signaling interaction of a packet processing method according to an embodiment of this application.
FIG. 3 is a schematic diagram of a possible format of an NLRI field according to an embodiment of this application.

With reference to FIG. 2, the following describes the technical solutions provided in embodiments of this application. FIG. 2 is a diagram of signaling interaction of a packet processing method according to an embodiment of this application. The method includes the following steps S201 to S205.

S201: A second device sends a notification message to a first device.

In this embodiment of this application, the first device may be a network device. The second device may be a control device, for example, may be a server or a controller configured to control one or more network devices. Alternatively, the second device may be a network device. Further, the first device may be a network device configured to forward a data packet in a network system, for example, may be any one or more of the network device 121, the network device 122, the network device 123, the network device 124, the network device 125, and the network device 126 in FIG. 1A or FIG. 1B. The second device may be any network device other than the first device in FIG. 1A, or may be the control device 130 in FIG. 1B. The notification message may include a match entry and an action entry. The following separately describes the match entry and the action entry.

First, the match entry is described.

The match entry is used for determining whether an extension packet header included in a to-be-processed packet matches a match condition. A packet that includes an extension packet header that matches the match entry is referred to as a packet that meets the match entry. In this embodiment of this application, the extension packet header is a packet header that includes optional extension information and that is other than an outermost packet header in the packet. It can be learned from the foregoing description that the extension packet header may include any one or more of an IPv6 extension packet header, an MPLS extension header, and an IPv4 packet header including an IPv4 option. For ease of description, an example in which the extension packet header is an IPv6 extension packet header is used for description in the following.

The IPv6 extension packet header may include any one or more of extension packet headers such as a hop-by-hop options extension packet header (HBH), a routing extension packet header (RH), a destination options extension packet header (DOH), and a segment routing extension packet header (SRH).

In this embodiment of this application, the match entry may be used for matching a type of an extension packet header included in a packet, or may be used for matching a specific field and/or a value of a specific field in an extension packet header included in a packet. A description is separately provided below.

First, a case in which the match entry is used for matching a type of an extension packet header included in a packet is first described. Further, the match entry may include a first packet header information set, and the first packet header information set includes an identifier of one or more extension packet headers. Optionally, the identifier of the extension packet header may be, for example, a protocol number of a target packet header. For example, if the first packet header information set includes an identifier of an HBH and an identifier of a DOH, the first packet header information set includes a type number of the HBH being 0 and a type number of the DOH being 60.

In addition, the match entry may further include a match condition, used for determining a correspondence between an extension packet header included in the to-be-processed packet and an extension packet header corresponding to the first packet header information set. In other words, if the to-be-processed packet meets the match entry, the first packet header information set and a second packet header information set included in the to-be-processed packet need to meet the match condition. In this embodiment of this application, the match condition may include three match conditions: a match-all condition, a match-any condition, and an exclude match condition. A description is separately provided below.

In a first possible implementation, the match condition is a match-all condition. If the second packet header information set and the first packet header information set meet the match-all condition, the second packet header information set includes identifiers of all extension packet headers in the first packet header information set, in other words, the first packet header information set is a subset of the second packet header information set. In other words, if a packet meets the match entry with the match condition being the match-all condition, the packet includes each extension packet header corresponding to the first packet header information set.

Correspondingly, if the match condition corresponding to the match entry is the match-all condition, in a process of determining whether the packet meets the match entry, the first device may determine whether the packet includes each extension packet header in one or more extension packet headers corresponding to the first packet header information set. If the packet includes each extension packet header in one or more extension packet headers corresponding to the first packet header information set, the first device determines that the packet meets the match entry.

In a second possible implementation, the match condition is a match-any condition. If the second packet header information set and the first packet header information set meet the match-any condition, the second packet header information set includes an identifier of any one or more extension packet headers in the first packet header information set, in other words, an intersection exists between the first packet header information set and the second packet header information set. In other words, if a packet meets the match entry with the match condition being the match-any condition, the packet includes any one or more extension packet headers corresponding to the first packet header information set.

Correspondingly, if the match condition corresponding to the match entry is the match-any condition, in a process of determining whether the packet meets the match entry, the first device may determine whether the packet includes any one or more extension packet headers in the first packet header information set. If the packet includes any one or more extension packet headers in the first packet header information set, the first device determines that the packet meets the match entry.

In a third possible implementation, the match condition is an exclude match condition. If the second packet header information set and the first packet header information set meet the exclude match condition, the second packet header information set does not include an identifier of any extension packet header in the first packet header information set, in other words, no intersection exists between the first packet header information set and the second packet header information set. In other words, if a packet meets the match entry with the match condition being the exclude match condition, the packet does not include any extension packet header corresponding to the first packet header information set.

Correspondingly, if the match condition corresponding to the match entry is the exclude match condition, in a process of determining whether the packet meets the match entry, the first device may determine whether the packet includes any one or more extension packet headers in the first packet header information set. If the packet does not include any one or more extension packet headers in the first packet header information set, the first device determines that the packet meets the match entry.

It may be understood that the match condition corresponding to the match entry may include any one or more of the foregoing three match conditions, and the exclude match condition and the match-any condition do not correspond to a same match entry.

In the foregoing three possible implementations, if the foregoing technical solution is implemented based on a FlowSpec technology, the match entry may be a newly defined match type (Component) in the notification message. Optionally, a match type corresponding to the match entry may be referred to as an extension header (Extension_Headers) type. The match entry may be described in a format of "<Type, Length, match_op, [value]+>". The type (Type) represents a type number of a newly defined component Extension_Headers. The length (Length) represents a total length of the match entry. The match rule (match_op) represents a match condition corresponding to the match entry, and may include any one of a match-any condition (match-any), a match-all condition (match-all), and an exclude match condition (exclude), and the value represents an identifier of an extension packet header corresponding to the match entry, and one match entry may include one or more values. Optionally, the match entry may be represented in a format of <type, (length), [numeric_op, value]+>, where a function of numeric_op is the same as or similar to a function of match_op.

First, a scenario in which the match condition is used for matching a type of an extension packet header included in a packet is described above. The following describes a scenario in which the match entry is used for matching a specific field or a value of a specific field in an extension packet header included in a packet.

Further, the first packet header information set includes an identifier of a first extension packet header and an identifier of a first field. For example, the first packet header information set may include a correspondence between the identifier of the first extension packet header and the identifier of the first field, indicating that a packet that meets the match entry includes the first extension packet header, and the first extension packet header includes the first field. Correspondingly, for a packet that meets the match entry, the second packet header information set corresponding to the packet also includes the identifier of the first extension packet header and the identifier of the first field. It may be understood that if the first packet header information set includes a correspondence between an identifier of the first packet header and the identifier of the first field, the match condition corresponding to the first packet header information set may be the foregoing match-all condition or match-any condition. In other words, the packet that matches the match entry includes the first extension packet header, and the first extension packet header further includes the first field. In a process of determining whether the packet is a packet that meets the match entry, it may be first determined whether the packet includes the first extension packet header. If the packet includes the first extension packet header, it may be further determined whether the first extension packet header of the packet includes the first field. If the first extension packet header of the packet includes the first field, the first device determines that the packet is a packet that meets the match entry. Optionally, the first field may be, for example, an option field in an extension packet header.

In the foregoing implementation, the match entry is used for matching a type of a packet header included in the packet and a specific field in the packet header. In some other implementations, the match entry may be further used for matching a value of a specific field in a packet header of the packet.

Further, the first packet header information set includes an identifier of a second extension packet header, an identifier of a second field, and a first value. For example, the first packet header information set may include a correspondence among the identifier of the second extension packet header, the identifier of the second field, and the first value, indicating that a packet that meets the match entry includes the second extension packet header, and the second extension packet header of the packet includes a second field whose value is the first value. Correspondingly, for a packet that meets the match entry, the second packet header information set corresponding to the packet also includes the correspondence among the identifier of the second extension packet header, the identifier of the second field, and the first value. In other words, a packet that matches the match entry includes the second extension packet header, and a value of the second field in the second extension packet header is the first value.

If the foregoing technical solution is implemented based on a FlowSpec technology, the match entry may be a newly defined match type (Component). Optionally, a match type corresponding to the match entry may be referred to as an extension header option (Extension_Header_Options) type. The match entry may be described in a format of "<Type, Length, option_type, option_value>". The type (Type) represents a type number of a newly defined component Extension_Header_Options, the length (Length) represents a total length of the match entry, the option type (option_type) represents a field value corresponding to the match entry or a type of an option, and the option value (option_value) represents a field value or an option value corresponding to the match entry. In a process of determining whether the packet is a packet that meets the match entry, it is first determined whether the packet includes the second extension packet header. If the packet includes the second extension packet header, it may continue to be determined whether the second extension packet header of the packet includes the second field. If the second extension packet header of the packet includes the second field, it may be further determined whether the value of the second field in the second extension packet header of the packet is the first value. If the value of the second field in the second extension packet header of the packet is the first value, it may be determined that the packet is a packet that meets the match entry. It may be understood that if the first packet header information set includes a correspondence among an identifier of a second packet header, the identifier of the second field, and the first value, the match condition corresponding to the first packet header information set may be the foregoing match-all condition or match-any condition.

The foregoing describes the match entry. The following describes the action entry.

In this embodiment of this application, the action entry is used for indicating the first device to process a packet including an extension packet header that matches the match entry. In other words, if the extension packet header included in the packet matches the match entry, it indicates that the packet includes a specific extension packet header. In this case, the first device may process the packet in a specific processing manner based on the action entry. In this way, the match entry and the action entry are adjusted, so that processing of a packet carrying an extension packet header can be flexibly controlled, to improve flexibility of packet processing.

An example is used for description. It can be learned from the foregoing description that different network devices in a network system may have different capabilities of processing an extension packet header. As a result, a packet including an extension packet header is discarded in a process in which the packet is processed by a network device that does not have a capability of processing the extension packet header. Therefore, to improve reliability of packet forwarding, a network device that does not have a capability of processing an extension packet header may be kept from receiving a packet including the extension packet header. When a network device that cannot process the packet exists in a network, if a forwarding path of the packet includes a device that cannot correctly process an extension packet header included in the packet, the packet may be discarded in a forwarding process. Therefore, the first device may control a forwarding path of a packet by using an action entry, to avoid discarding of the packet in a forwarding process, so that reliability of packet forwarding is improved.

For detailed description of the action entry, refer to the following. Details are not described herein again.

The foregoing describes the match entry and the action entry that are included in the notification message. The following describes a manner in which the notification message carries the match entry and the action entry.

In this embodiment of this application, the notification message is sent by the second device to the first device. Further, the second device may send the notification message to the first device based on a BGP, or may send the notification message to the first device based on a PCEP. A description is separately provided below.

In a first possible implementation, the second device sends the notification message to the first device based on the BGP, and the notification message is a BGP update message. The technical solutions provided in embodiments of this application may be implemented based on a BGP Flowspec technology.

Further, the foregoing match entry may be carried in an NLRI field of the notification message. The NLRI field may be carried in NLRI information corresponding to a BGP FlowSpec address family of the notification message. For example, the NLRI information of the BGP FlowSpec address family of the notification message may include a multi-protocol extension reachable NLRI (Multi-Protocol Reachable NLRI, MP_REACH_NLRI) field, and MP_REACH_NLRI field may further include an NLRI field used for carrying a match entry. Optionally, a format of the MP_REACH_NLRI field may be shown in FIG. 3. The MP_REACH_NLRI field may include an AF information field, a next hop network address information field, and the NLRI field. In an example, the AF information field occupies 3 octets, in other words, 24 bits. The foregoing match entry may be carried in the NLRI field.

Correspondingly, the foregoing action entry may be used as a new BGP route attribute, and is carried in a route attribute information field or the NLRI field of the notification message. For example, the action entry may be carried as an IPv6 address-related extended community attribute or a wide community attribute of the new BGP in an IPv6 address-related extended community attribute field or a wide community attribute field of the notification message. The extended community attribute and the wide community attribute are route attributes, in other words, the IPv6 address-related extended community attribute field or the wide community attribute field that carries the action entry may be one type of the BGP route attribute information. In other words, the action entry may be carried in the IPv6 address-related extended community attribute field of the BGP route attribute information field of the notification message.

In a second possible implementation, the second device sends the notification message to the first device based on the PCEP. In this case, the notification message may be any one of a PCInitiate message, a PCUpd message, and a PCRep message. Correspondingly, the foregoing match entry may be carried in flow specification object (Flowspec Object) information of the notification message. Further, the Flowspec Object information of the notification message may include a flow filter type-length-value (Flow Filter TLV) field. The Flow Filter TLV field may include one or more TLV fields, and is used for carrying a matching rule of a BGP flowspec.

An example is used for description. The Flow Filter TLV field of the notification message may include an extension header TLV (Extension_Headers TLV) field and/or an extension header option TLV (Extension_Header_options TLV). The Extension_Headers TLV field and the Extension_Header_options TLV field are used for carrying the foregoing match entry. Further, if the match entry includes the first packet header information set and the match condition, the match entry may be carried in an Extension_Headers TLV field. If the first packet header information set of the match entry further includes the identifier of the first packet header and the identifier of the first field, the match entry may be carried in an Extension_Header_options TLV field.

In some other possible implementations, the second device may alternatively send the notification message to the first device by using a Network Configuration (NETCONF) protocol. Correspondingly, if the second device sends the notification message to the first device by using a NETCONF protocol in a format defined by a Yet Another Next Generation (YANG) model, the notification message sent by the second device may be a NETCONF message.

It may be understood that one notification message may include one match entry and one action entry, or may include a plurality of match entries and/or a plurality of action entries. If the notification message received by the first device includes a plurality of match entries and a plurality of action entries, the first device may generate a plurality of forwarding entries. Each forwarding entry in the plurality of forwarding entries may correspond to one match entry and one action entry. Alternatively, if a plurality of match entries corresponds to one action entry, the first device may generate one forwarding entry, and the forwarding entry includes a correspondence between the plurality of match entries and the action entry.

S202: The first device generates a forwarding entry based on the notification message.

After receiving the notification message sent by the second device, the first device may generate a forwarding entry based on the notification message. The forwarding entry includes a correspondence between a match entry and an action entry, and is used for indicating the first device to process, based on the action entry, a packet that meets the match entry. Optionally, the forwarding entry may be an access control list (ACL) entry or a forwarding information base (FIB) entry.

The foregoing describes a manner in which the second device configures a forwarding entry on the first device. The following describes a method for processing a packet by the first device based on a forwarding entry.

S203: The first device receives a first packet sent by a third device.

In this embodiment of this application, the first device may be a network device configured to forward the data packet in the network system, and the third device may be a device directly connected to the first device. The first packet may be an IPv6 packet, or may be an MPLS packet or an IPv4 packet. For ease of understanding, the following uses an example in which the first packet is an IPv6 packet for description.

If the first device is a PE device, the third device may be a terminal device that generates the first packet, for example, may be a computer or a server. If the first device is a P device, the third device may be a last hop network device of the first device on a forwarding path of the first packet.

It may be understood that because the first device is a network device configured to process the first packet, to keep the first packet from being discarded by the first device, a capability of processing a plurality of extension packet headers may be configured on the first device. In this way, after receiving the first packet, the first device may process the extension packet header included in the first packet. The first packet is not discarded because the first device does not have a capability of processing an extension packet header.

S204: The first device determines whether the first packet includes an extension packet header that matches a match entry.

After receiving the first packet, the first device determines whether the first packet meets the match entry, in other words, determines whether the first packet includes a packet header that matches the match entry. If the first packet does not meet the match entry, the first device forwards the first packet based on a destination address of the first packet, or if the first packet meets the match entry, the first device performs S205. The following describes the method for determining, by the first device, whether the first packet meets the match entry.

In this embodiment of this application, the match entry may include a first packet header information set, and the first packet header information set includes an identifier of one or more packet headers. In this case, in a process of determining whether the first packet meets the match entry, the first device may first determine the second packet header information set corresponding to the first packet, and then determine whether the second packet header information set corresponding to the first packet and the first packet header information set meet the match condition. If the second packet header information set corresponding to the first packet and the first packet header information set do not meet the match condition, the first device determines that the first packet does not meet the match entry. If the second packet header information set corresponding to the first packet and the first packet header information set meet the match condition, the first device may determine that the first packet meets the match entry.

It can be learned from the foregoing description that the match condition may include any one of a match-all condition, a match-any condition, and an exclude match condition. A description is separately provided below.

In a first possible implementation, the match condition is a match-all condition, and the first device may determine whether the first packet includes each extension packet header in one or more extension packet headers corresponding to the first packet header information set. If the first packet includes each extension packet header in one or more extension packet headers corresponding to the first packet header information set, the first device determines that the first packet meets the match condition.

An example is used for description. If the first packet header information set includes an identifier of an HBH, an identifier of a DOH, and an identifier of an RH, and the match condition is a match-all condition, the first device may determine whether the first packet includes all three extension packet headers: an HBH, a DOH, and an RH. If the first packet does not include any one of the three extension packet headers: an HBH, a DOH, and an RH, the first device determines that the first packet does not meet the match entry, or if the first packet includes all the three extension packet headers: an HBH, a DOH, and an RH, the first device determines that the second device meets the match condition.

In a second possible implementation, the match condition is a match-any condition, and the first device may determine whether the first packet includes any extension packet header corresponding to the first packet header information set. If the first packet includes any extension packet header corresponding to the first packet header information set, the first device determines that the first packet meets the match condition.

An example is used for description. If the first packet header information set includes an identifier of an HBH, an identifier of a DOH, and an identifier of an RH, and the match condition is a match-any condition, the first device may determine whether the first packet includes any one of three extension packet headers: an HBH, a DOH, and an RH. If the first packet includes any one of the three extension packet headers: an HBH, a DOH, and an RH, the first device determines that the second device meets the match entry. If the first packet does not include any one of the three extension packet headers: an HBH, a DOH, and an RH, the first device determines that the second device does not meet the match entry.

In a third possible implementation, the match condition is an exclude match condition, and the first device may determine whether the first packet includes any extension packet header corresponding to the first packet header information set. If the first packet includes any extension packet header corresponding to the first packet header information set, the first device determines that the first packet does not meet the match condition.

An example is used for description. If the first packet header information set includes an identifier of an HBH, an identifier of a DOH, and an identifier of an RH, and the match condition is an exclude match condition, the first device may determine whether the first packet includes any one of three extension packet headers: an HBH, a DOH, and an RH. If the first packet includes any one of the three extension packet headers: an HBH, a DOH, and an RH, the first device determines that the second device does not meet the match entry. If the first packet does not include any one of the three extension packet headers: an HBH, a DOH, and an RH, the first device determines that the second device meets the match entry.

In some possible implementations, values of some fields in the extension packet header are adjusted, so that extension packet headers of a same type can implement different purposes. In other words, if Types of two extension packet headers are the same, but values of fields in the extension packet headers are different, the two extension packet headers may correspond to different forwarding behaviors. Correspondingly, manners of processing the two extension packet headers may be different. In other words, for extension packet headers of a same type, if values of fields in the extension packet headers are different, required processing capabilities may be different.

An example is used for description. An extension packet header of an RH type includes a routing type field. A function of an RH may vary based on different values of the routing type field of the RH. For example, if a value of the routing type field in the extension packet header is 4, the extension packet header is an SRH-type extension packet header. A method for processing an extension packet header of an RH type with a value of a routing type field being 1, 2, 3, 5, or the like is different from a method for processing an extension packet header of an SRH type, and required processing capabilities are also different.

Therefore, to further determine a capability of processing an extension packet header by a network device, the match entry may further include information about a field in the extension packet header. To resolve the foregoing problem, it may be learned from the foregoing description that the first packet header information set may include the identifier of the first packet header and the identifier of the first field, or may include the identifier of the second packet header, the identifier of the second field, and the first value.

If the first packet header information set includes the identifier of the first packet header and the identifier of the first field, in a process of determining whether the first packet meets the match entry, the first device may determine whether the first packet includes the first packet header. If the first packet does not include the first packet header, the first device determines that the first packet does not meet the match entry. If the first packet includes the first packet header, the first device may further determine whether the first packet header of the first packet includes the first field. If the first packet header of the first packet does not include the first field, the first device determines that the first packet does not meet the match entry. If the first packet header of the first packet includes the first field, the first device determines that the first packet meets the match entry.

If the first packet header information set includes the identifier of the second packet header, the identifier of the second field, and the first value, in a process of determining whether the first packet meets the match entry, the first device may first determine whether the first packet includes the second packet header. If the first packet includes the second packet header, the first device may continue to determine whether the second packet header includes the second field. If the second packet header of the first packet includes the second field, the first device may further determine whether the value of the second field is the first value. If the first packet does not include the second packet header, or the second packet header of the first packet does not include the second field, or the value of the second field in the second packet header of the first packet is not the first value, the first device determines that the first packet does not meet the match entry. If the value of the second field in the second packet header of the first packet is the first value, the first device determines that the first packet meets the match entry.

S205: In response to that the first packet includes the extension packet header that matches the match entry, the first device processes the first packet based on the action entry.

Optionally, after determining that the first packet meets the match entry, the first device may process the first packet based on the action entry. In this embodiment of this application, the action entry is used for keeping a network device that does not have a capability of processing an extension packet header of a packet that matches the match entry from processing the first packet. In this way, in a subsequent process of forwarding the first packet, each network device on the forwarding path of the first packet can correctly process the first packet, to improve reliability of packet forwarding. In this way, a network device having a capability of processing the extension packet header of the first packet forwards the data packet, to reduce a probability that the packet is discarded, so that reliability of packet forwarding is improved.

In a first possible implementation, the first device determines a forwarding path based on the action entry, and a network device on the forwarding path can process the extension packet header included in the first packet.

Further, the first device may first determine a first forwarding path based on the first packet, and then forward the first packet through the first forwarding path. Any network device on the first forwarding path has a capability of processing the extension packet header included in the first packet, or one or more network devices specified on the first forwarding path have a capability of processing the extension packet header included in the first packet. The one or more specified network devices are network devices that are on the first forwarding path and that need to process the extension packet header included in the first packet. In this way, the network device on the first forwarding path does not discard the first packet because of the extension packet header included in the first packet, to improve reliability of packet forwarding.

FIG. 1 is used as an example for description. It is assumed that the network device 122 and the network device 125 do not have a capability of processing an SRH, and the network device 121, the network device 123, the network device 124, and the network device 126 have a capability of processing an SRH.

For an SRv6 packet K sent by the device 111 to the device 112, a first forwarding path determined by the network device 121 for the packet K is a forwarding path "network device 121→network device 124→network device 125→network device 126". In this case, a segment identifier (SID) list corresponding to the packet K may include a SID of the network device 121, a SID of the network device 124, and a SID of the network device 126. The network device 121, the network device 124, and the network device 126 are specified network devices on the first forwarding path, and all the specified network devices have a capability of processing the extension packet header included in the first packet. After the network device 121 receives the packet K, because the SID list of the packet K includes the SID of the network device 121, the network device 121 may process the SRH of the packet K. After the network device 125 receives the packet K, because the SID list of the packet K does not include the SID of the network device 125, the network device 125 does not need to process the SRH of the packet K, and directly forwards the packet K based on the SID of the network device 126 in a forwarding process. In this way, even if the first network device 125 does not have a capability of processing an SRH, the SID list of the packet K is adjusted, so that the network device 125 can be kept from parsing the SRH of the packet K, to avoid discarding of the packet K by the network device 125, and reliability of packet forwarding is improved.

The following describes a method for determining the first forwarding path by the first device.

Further, a support status of an extension packet header by network devices in a network may be first configured on the first device. After receiving a first packet, the first device may determine a plurality of candidate network devices based on the support status of an extension packet header by the network devices and an identifier of an extension packet header included in the first packet. The candidate network device is a network device that does not discard the first packet because of the extension packet header included in the first packet, for example, may be a network device that has a capability of processing the extension packet header included in the first packet.

Then, the first device determines a plurality of target network devices from the plurality of candidate network devices based on a destination address of the first packet and a topology structure of the network system, to obtain a first forwarding path. The target network devices are network devices on the first forwarding path. In other words, after determining the plurality of candidate network devices, the first device may plan a forwarding path from the first device to the destination device of the first packet according to a connection relationship among the plurality of candidate network devices. The forwarding path is the first forwarding path.

After determining the first forwarding path, the first device sends the first packet through the first forwarding path. In this embodiment of this application, that the first device sends the first packet through the first forwarding path may include the following. The first device sends the first packet to a next-hop network device of the first device on the first forwarding path. Alternatively, that the first device sends the first packet through the first forwarding path may include the following. The first device sends the first packet through a tunnel corresponding to the first forwarding path. In other words, the action entry may be used for specifying a next-hop network device of the first packet, or may be used for specifying a tunnel for transmitting the first packet. For example, the first forwarding path is an SRv6 path, and an SID list corresponding to the SRv6 path may be compressed into the first packet, to forward the first packet along the SRv6 path.

It should be noted that the foregoing method for determining the first forwarding path may be performed by the first device, or may be performed by a control device in a network system. For example, the second device or another control device may determine the first forwarding path according to a capability of supporting a packet header by network devices in the network system and a connection relationship, and send "sending a packet through the first forwarding path" to the first device as an action entry. In this way, after receiving the first packet, the first device may send the first packet through the first forwarding path, and the first device does not need to determine the first forwarding path, so that a time for the first device to process the first packet is reduced, and a packet transmission delay is reduced.

Figure 1C:
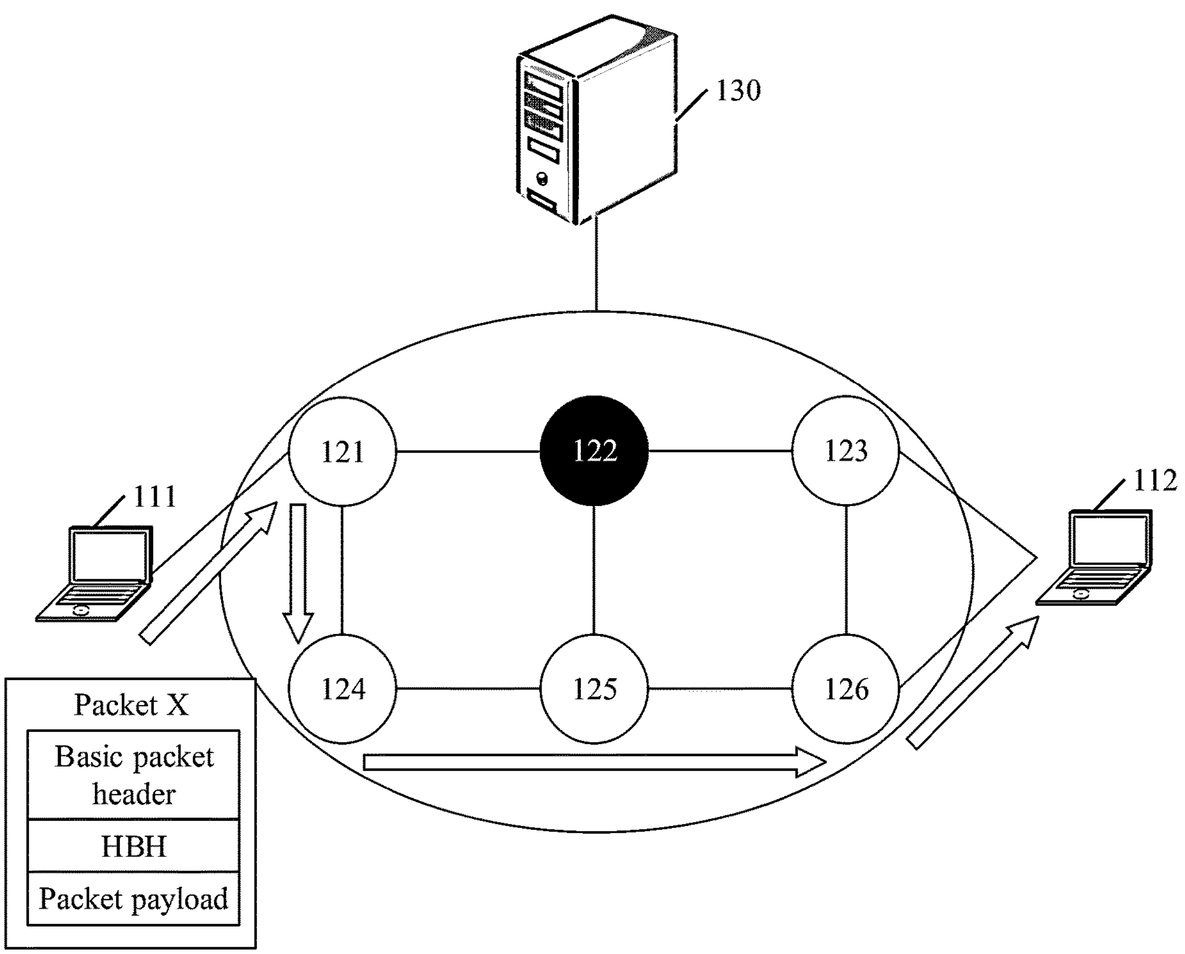
FIG. 1C is a schematic diagram of an application scenario of a packet processing method according to an embodiment of this application.

FIG. 1C is used as an example for description. It is assumed that the network device 121, the network device 123, the network device 124, the network device 125, and the network device 126 in FIG. 1C have a capability of processing an HBH, and the network device 122 does not have a capability of processing an HBH.

For a packet X that is sent by the device 111 to the device 112 and that includes an HBH, a forwarding path obtained according to one routing policy is a forwarding path "network device 121→network device 122→network device 123". However, because the network device 122 cannot process the HBH of the packet X, the packet X may be discarded by the network device 122.

To ensure normal transmission of the packet X, the control device 130 may send a notification message to the network device 121. The network device 121 may generate a forwarding entry based on the notification message. The match entry of the forwarding entry may include an identifier of an HBH and a match-any condition, and the action entry of the forwarding entry includes information about a forwarding path. For example, the SID list is <the SID of the network device 121, the SID of the network device 124, the SID of the network device 125, and the SID of the network device 126>, or the SID of the network device 124, the SID of the network device 125, and the SID of the network device 126. In this way, after receiving the packet X, because the packet X includes the HBH, the network device 121 determines that the packet X meets the match entry, compresses the SID list into the packet X, and sends the packet X through the forwarding path "network device 121→network device 124→network device 125→network device 126". Further, a transmission path of the packet X may be shown in FIG. 1C.

In a second possible implementation, the first device encapsulates a specific packet header into the first packet to ensure that the first packet can be correctly forwarded to a destination. A forwarding path of the first packet in which the specific packet header is encapsulated may pass through a network device that does not support processing of the extension packet header included in the first packet.

In the foregoing implementation, the first forwarding path is a forwarding path from the first device to the destination device of the first packet, and each hop of network device on the first forwarding path has a capability of processing the extension packet header included in the first packet. However, in some possible application scenarios, a quantity of network devices that have a capability of processing the extension packet header included in the first packet is limited, and cannot form a forwarding path from the first device to the destination device.

To implement normal transmission of a packet, the first device may encapsulate a specific packet header into the first packet, and send the encapsulated first packet along a second forwarding path. Further, the specific packet header may be referred to as an outer packet header. A destination address of the outer packet header is the same as a destination address of the first packet, or a destination address of the outer packet header is an address of an $N^{th}$ last hop network device of a destination device of the first packet (N is a positive integer), and a source address of the outer packet header is an address of the first device. Optionally, the network device on the second forwarding path may have a capability of processing an outer packet header. In this way, even if there is a network device that has no capability of processing the extension packet header included in the first packet on the second forwarding path, the outer packet header is encapsulated into the first packet to generate the second packet, so that the network device on the second forwarding path can be kept from processing the extension packet header included in the first packet, to ensure normal transmission of the first packet. In some possible implementations, the foregoing processing policy for sending the first packet through the second packet may be referred to as IPv6 outer encapsulation (or IPv6 encapsulation (IPv6_Encaps)).

Optionally, the first device may encapsulate the first packet as a payload of the second packet into the second packet. For example, assuming that the second packet is an IPv6 packet, the first device may carry the first packet to an upper-layer protocol data unit of the second packet, and add a basic packet header as an outer packet header to the second packet header.

It can be learned from the foregoing description that the extension packet header may be an IPv6 extension packet header or an MPLS extension header. Correspondingly, if the extension packet header is an MPLS extension header, the first device encapsulates an outer MPLS label for the first packet to obtain the second packet. The outer MPLS label of the second packet may identify a forwarding path to the destination address. In this way, the network device that forwards the second packet may determine a transmission path of the second packet based on the outer MPLS label of the second packet.

Optionally, the outer packet header encapsulated by the first device for the first packet further includes a first identifier, and the first identifier is used for triggering a device on the second forwarding path to determine, based on the first identifier, that the extension packet header included in the second packet does not need to be parsed. In other words, the device on the second forwarding path may directly forward the second packet based on the outer packet header without processing the extension packet header included in the second packet based on an indication of the first identifier. Therefore, a device on the second forwarding path is kept from discarding the second packet because the device does not have a capability of processing an extension packet header included in the second packet. For example, the second forwarding path includes a fourth network device. After receiving the second packet, the fourth network device determines that the second packet includes the first identifier, and forwards the second packet based on the outer packet header of the second packet without parsing any extension packet header included in the first packet in the second packet.

An example is used for description. If the first packet is an IPv6 packet, a value of a next header field in the outer packet header of the second packet may be a value of a type of a non-extension packet header, for example, may be 41. According to the specification of an IPv6 extension packet header in the Request for Comments (RFC) 2473, "A. Conta, 'Generic Packet Tunneling in IPv6," IETF, December 1998, which is incorporated by reference, 41 is the type number allocated to IPv6, indicating that an IPv6 packet is encapsulated in the outer packet header. Therefore, if the first device encapsulates an outer packet header with a value of a next header field being 41 for the first packet, a device receiving the second packet may determine, based on the value of the next header field in the outer packet header being 41, that an IPv6 packet (that is, the first packet) is encapsulated in the outer packet header, in other words, the first packet is used as a payload of the second packet, and the device receiving the second packet no longer needs to further parse the extension packet header included in the first packet, to avoid processing of the first packet, so that a probability that the network device discards the second packet is reduced.

In the foregoing implementation, the destination address of the outer packet header is the destination address of the first packet. In some other implementations, the destination address of the outer packet header may be an address of an $N^{th}$ last hop network device of the destination device of the first packet. N is a positive integer, and any network device on the forwarding path from the $N^{th}$ last hop network device of the destination device of the first packet to the destination device of the first packet has a capability of processing the extension packet header included in the first packet.

It may be understood that, after the destination device of the second packet receives the second packet, the destination device of the second packet may process the second packet, restore the second packet to the first packet, and continue with normal transmission of the first packet.

Figure 1D:
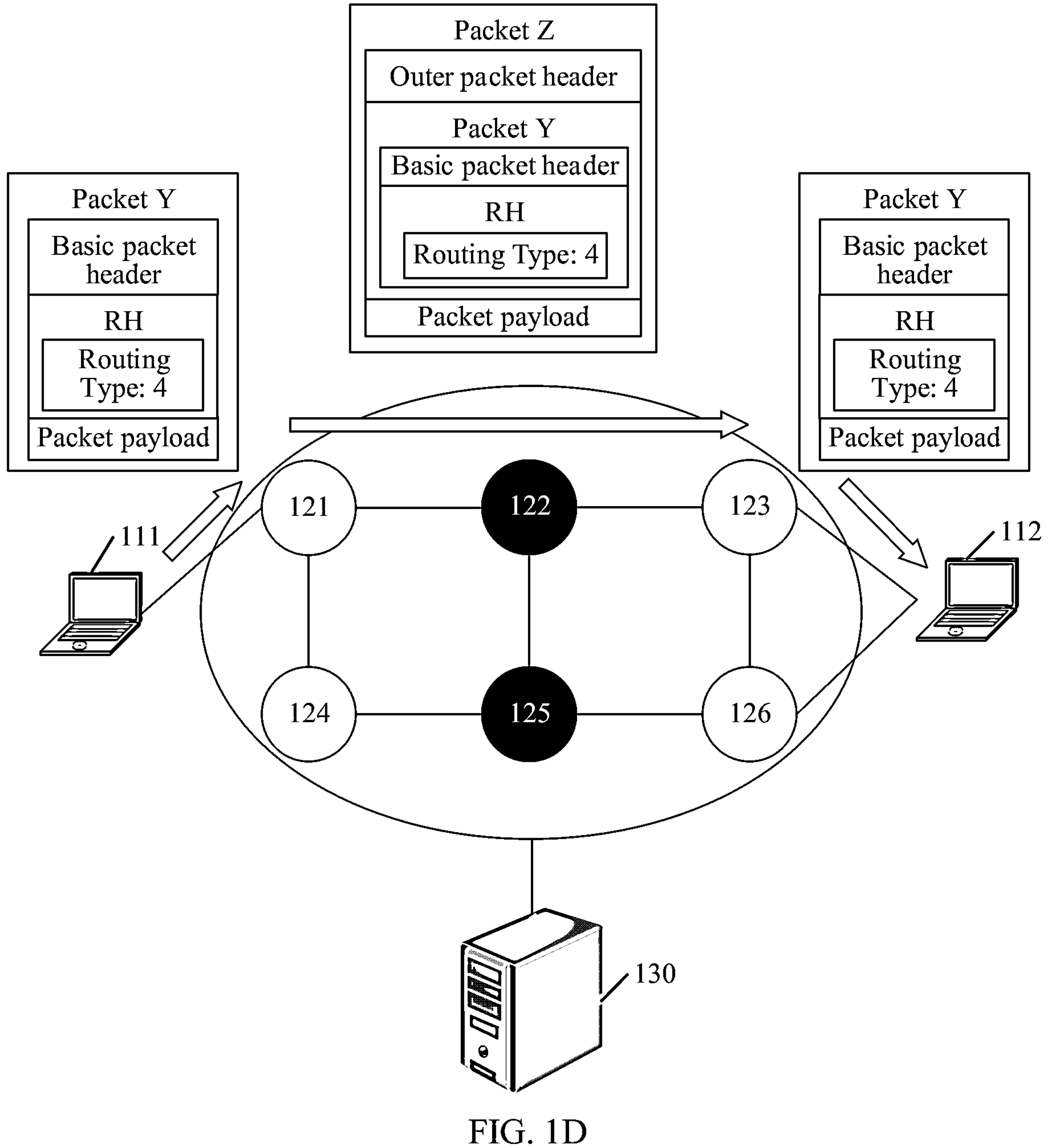
FIG. 1D is a schematic diagram of another application scenario of a packet processing method according to an embodiment of this application.

FIG. 1D is used as an example for description. It is assumed that the network device 121, the network device 123, the network device 124, and the network device 126 in FIG. 1D have a capability of processing an SRH, and the network device 122 and the network device 125 do not have a capability of processing an SRH.

For a packet Y sent by the device 111 to the device 112, and the packet Y includes an extension packet header N whose type is an SRH, the extension packet header N is an extension packet header of an RH type, and a value of a routing type field of the extension packet header N is 4. According to one routing policy, a forwarding path corresponding to the packet Y is a forwarding path "network device 121→network device 122→network device 123". However, because the network device 122 cannot process an SRH, the packet Y may be discarded by the network device 122. Further, because the network device 125 does not have a capability of processing an SRH, normal transmission of the packet Y cannot be ensured by modifying the forwarding path of the packet Y.

To ensure normal transmission of the packet Y, the control device 130 may send a notification message to the network device 121. The network device 121 may generate a forwarding entry based on the notification message. The match entry of the forwarding entry includes a correspondence between the protocol number corresponding to the SRH being 43, the identifier of the routing type field, and the first value being 4, and the action entry of the forwarding entry includes IPv6_Encaps.

In this way, after receiving the packet Y, because the packet Y includes the extension packet header N whose type number is 43, the network device 121 may further determine whether a value of the routing type field in the extension packet header N of the packet Y is the first value being 4. Because the type number of the extension packet header N is 43 and the value of the routing type field in the extension packet header Nis 4, the extension packet header N matches the match entry, it indicates that the extension packet header N is an SRH, and the extension packet header N matches the match entry. In this case, the network device 121 may encapsulate the outer packet header into the packet Y based on the action entry, to obtain a packet header Z. A destination address of the packet Z is an address of the network device 123, and a source address of the packet Z is an address of the network device 121.

After obtaining the packet Z, the network device 121 may determine a forwarding path of the packet Z based on the destination address of the packet Z, and send the packet Z to the destination device of the packet Z through a corresponding network interface. For example, the network device 121 may determine that the forwarding path of the packet Z is the forwarding path "network device 121→network device 122→network device 123", and then send the packet Z to the network device 123 through the network interface A1. After receiving the packet Z, the network device 123 may obtain the packet Y based on an upper-layer protocol data unit of the packet Z, and send the packet Z to the device 112, to implement normal transmission of the packet Z. Further, a transmission path of the packet X may be shown in FIG. 1D.

It can be learned from the foregoing description that the second device may establish, on the first device through the notification message, a forwarding entry that includes the match entry and the action entry, so that the first device processes, based on the action entry, a packet that includes an extension packet header that matches the match entry. In other words, if the packet includes the extension packet header that matches the match entry, the first device may process the packet based on the action entry. The match entry is a match condition for the extension packet header included in the packet. If the packet meets the match entry, it indicates that the packet includes a specific extension packet header. In this case, the first device may process the packet in a specific processing manner based on the action entry. In this way, the match entry and the action entry are adjusted, so that a packet carrying an extension packet header can be flexibly processed, to improve reliability of packet forwarding.

It may be understood that functions of the match entry and the action entry are not limited thereto. In some other possible implementations, a packet having any extension packet header may be flexibly processed by using the match entry and the action entry. In other words, the first device processes a packet having a specific extension packet header. For example, in some possible implementations, the second device may indicate the first device to collect related information in a packet transmission process, or forward a packet through a forwarding path, to improve flexibility of packet forwarding.

Figure 1E:
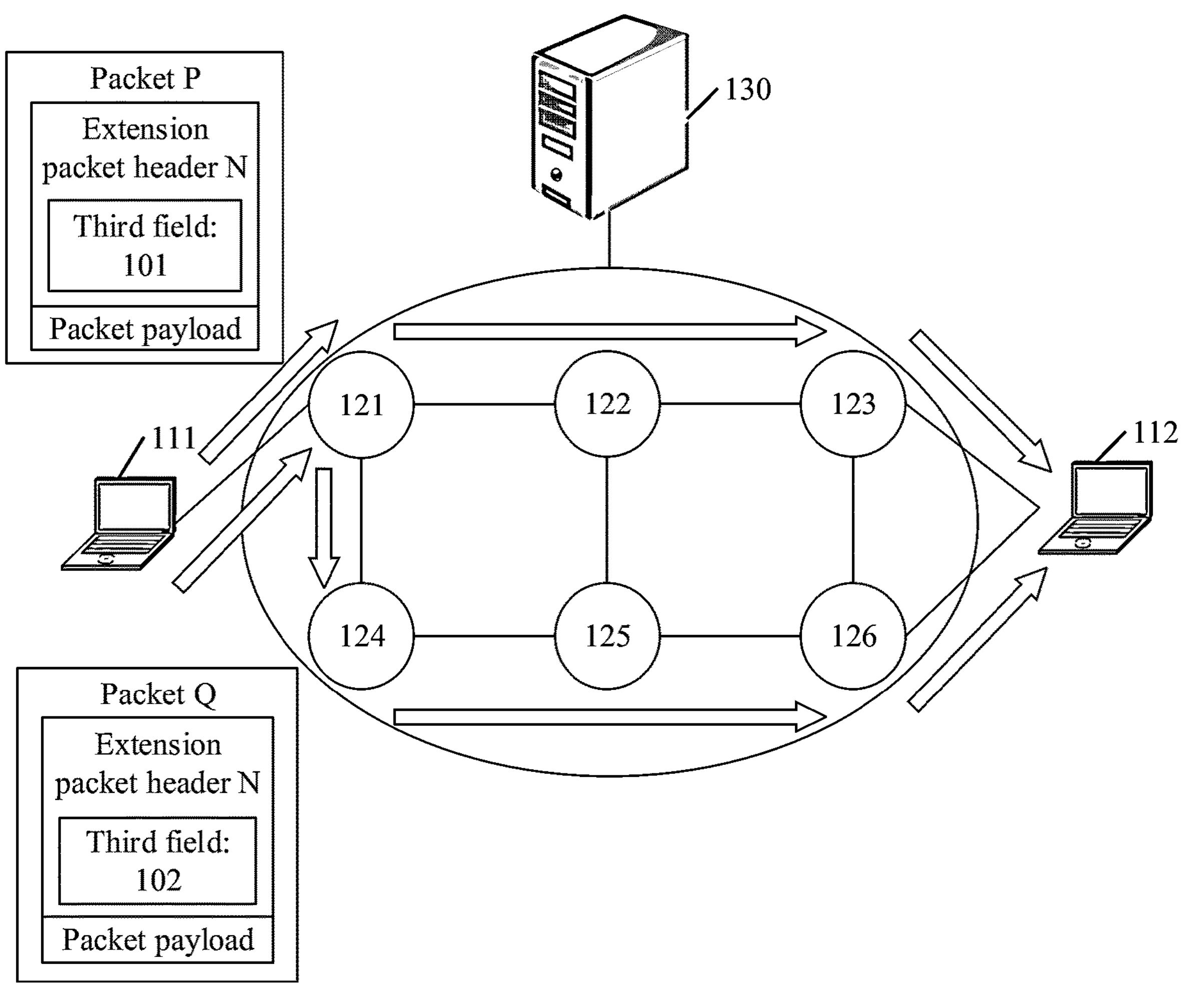
FIG. 1E is a schematic diagram of still another application scenario of a packet processing method according to an embodiment of this application.

FIG. 1E is used as an example for description. It is assumed that each network device in FIG. 1E has a capability of processing a packet header M, and the device 111 sends a packet P and a packet Q to the device 112. Each of the packet P and the packet Q includes an extension packet header N, and each of the extension packet header N of the packet P and the extension packet header N of the packet Q includes a third field. For the packet P, a value of the third field in the extension packet header N of the packet P is 101, and for the packet Q, a value of the third field in the extension packet header N of the packet Q is 102. According to one routing policy, the packet P and the packet Q may be forwarded to the device 112 through a forwarding path "network device 121→network device 122→network device 123".

To reduce pressure of the network device 122, the control device 130 may send the notification message to the network device 121. The network device 121 may generate a forwarding entry based on the notification message. The forwarding entry includes a match entry and an action entry. The match entry includes a correspondence among an identifier of the extension packet header N, an identifier of the third field, and a first value 102, and the action entry is used for indicating to forward a packet through a forwarding path "network device 121→network device 124→network device 125→network device 126".

In this way, after the packet P and the packet Q are received, because the value of the third field in the extension packet header N of the packet P is 102 and the packet P does not meet the match entry, the network device 121 may send the packet P to the network device 122 through the network interface A1, so that the packet P is forwarded through the forwarding path "network device 121→network device 122→network device 123". Because the value of the third field in the extension packet header N of the packet Q is 101 and the packet Q meets the match entry, the network device 121 may send the packet Q to the network device 124 through the network interface A2, so that the packet Q is forwarded through the forwarding path "network device 121→network device 124→network device 125→network device 126". In this way, flexibility of packet forwarding is improved. Further, a transmission path of the packet X may be shown in FIG. 1E.

Figure 4:
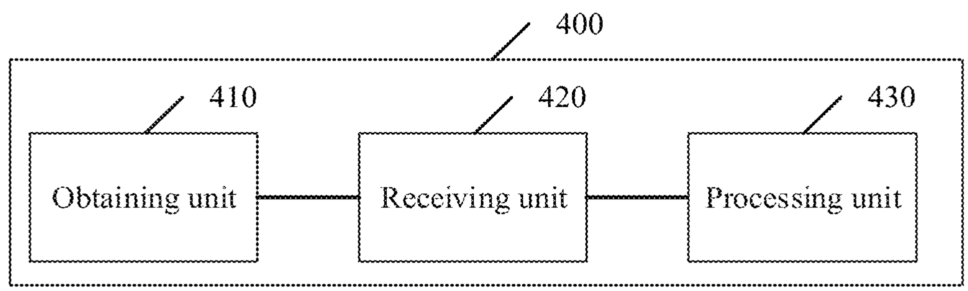
FIG. 4 is a schematic diagram of a structure of a packet processing apparatus according to an embodiment of this application.

Referring to FIG. 4, an embodiment of this application further provides a packet processing apparatus 400. The packet processing apparatus 400 may implement functions of the first device in the embodiment shown in FIG. 2. The packet processing apparatus 400 includes an obtaining unit 410, a receiving unit 420, and a processing unit 430. The obtaining unit 410 is configured to implement S203 in the embodiment shown in FIG. 2, the receiving unit 420 is configured to implement S204 in the embodiment shown in FIG. 2, and the processing unit 430 is configured to implement S205 and S206 in the embodiment shown in FIG. 2.

Further, the obtaining unit 410 is configured to obtain a forwarding entry, where the forwarding entry includes a match entry and an action entry, and the match entry includes an identifier of one or more extension packet headers.

The receiving unit 420 is configured to receive a first packet.

The processing unit 430 is configured to determine that the first packet includes an extension packet header that matches the match entry, and process the first packet based on the action entry in response to determining that the first packet includes the extension packet header that matches the match entry.

It may be understood that, if the forwarding entry is sent by another network device to the first device, the obtaining unit 410 may belong to the receiving unit 420. If the forwarding entry is generated by the first device based on the notification message, the obtaining unit 410 may belong to the processing unit 430.

For an execution process, refer to the detailed descriptions of corresponding steps in the foregoing embodiment shown in FIG. 2. Details are not described herein again.

Figure 5:
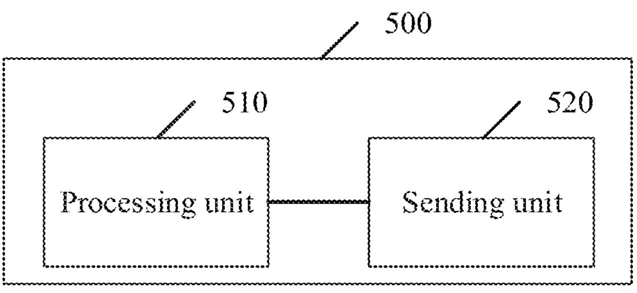
FIG. 5 is a schematic diagram of a structure of a packet processing apparatus according to an embodiment of this application.

Referring to FIG. 5, an embodiment of this application further provides a packet processing apparatus 500. The packet processing apparatus 500 may implement functions of the second device in the embodiment shown in FIG. 2. The packet processing apparatus 500 includes a processing unit 510 and a sending unit 520. The processing unit 510 is configured to implement S201 in the embodiment shown in FIG. 2, and the sending unit 520 is configured to implement S202 in the embodiment shown in FIG. 2.

Further, the processing unit 510 is configured to generate a notification message, where the notification message includes a match entry and an action entry, and the match entry includes an identifier of one or more extension packet headers.

The sending unit 520 is configured to send the notification message to a first device, where the notification message is used for triggering the first device to process, based on the action entry, a packet including an extension packet header that matches the match entry.

For an execution process, refer to the detailed descriptions of corresponding steps in the foregoing embodiment shown in FIG. 2. Details are not described herein again.

Figure 6:
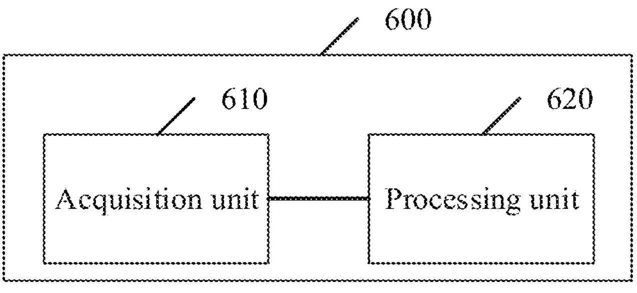
FIG. 6 is a schematic diagram of a structure of a packet processing apparatus according to an embodiment of this application.

Referring to FIG. 6, an embodiment of this application further provides a packet processing apparatus 600. The packet processing apparatus 600 may implement functions of the first device in the embodiment shown in FIG. 2. The packet processing apparatus 600 includes an acquisition unit 610 and a processing unit 620. The acquisition unit 610 is configured to receive the notification message sent by the first device, and the processing unit 620 is configured to implement S203 in the embodiment shown in FIG. 2.

Further, the acquisition unit 610 is configured to acquire a notification message, where the notification message includes a match entry and an action entry, the match entry includes an identifier of one or more extension packet headers, and the action entry is used for indicating the first device to process a packet including an extension packet header that matches the match entry.

The processing unit 620 is configured to generate a forwarding entry based on the notification message, where the forwarding entry includes a correspondence between the match entry and the action entry.

For an execution process, refer to the detailed descriptions of corresponding steps in the foregoing embodiment shown in FIG. 2. Details are not described herein again.

It should be noted that, in this embodiment of this application, division into the units is an example, and is merely a logical function division. In actual implementation, another division manner may be used. Functional units in embodiments of this application may be integrated into one processing unit, each of the units may exist alone physically, or two or more units are integrated into one unit. For example, in the foregoing embodiment, the acquisition unit, the processing unit, and the sending unit may be a same unit or different units. The integrated unit may be implemented in a form of hardware, or may be implemented in a form of a software functional unit.

Figure 7:
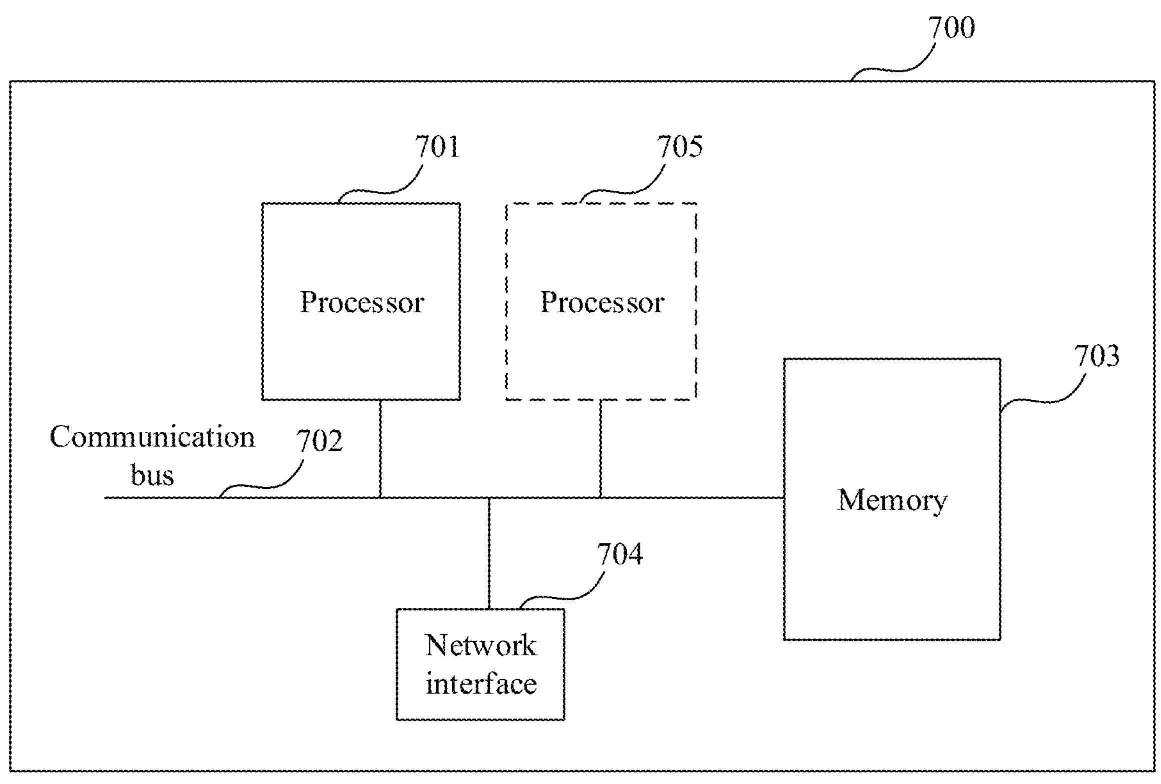
FIG. 7 is a schematic diagram of a structure of a device according to an embodiment of this application.

FIG. 7 is a schematic diagram of a structure of a device 700 according to an embodiment of this application. The foregoing packet processing apparatus 400, packet processing apparatus 500, and packet processing apparatus 600 may be implemented by using a device shown in FIG. 7. Refer to FIG. 7. A device 700 includes at least one processor 701, a communication bus 702, and at least one network interface 704. Optionally, the device 700 may further include a memory 703.

The processor 701 may be a general-purpose CPU, an application-specific integrated circuit (ASIC), or one or more integrated circuits (ICs) configured to control program execution of the solutions of this application. The processor may be configured to process a packet or a periodicity parameter, to implement the packet processing method provided in embodiments of this application.

For example, when the first device in FIG. 2 is implemented by the device shown in FIG. 7, the processor may be configured to obtain a forwarding entry, where the forwarding entry includes a match entry and an action entry, and the match entry includes an identifier of one or more extension packet headers, receive a first packet, determine that the first packet includes an extension packet header that matches the match entry, and process the first packet based on the action entry in response to determining that the first packet includes the extension packet header that matches the match entry.

The communication bus 702 is configured to transmit information between the processor 701, the network interface 704, and the memory 703.

The memory 703 may be a read-only memory (ROM) or another type of static storage device that may store static information and instructions. The memory 703 may be alternatively a random-access memory (RAM) or another type of dynamic storage device that may store information and instructions, or may be a compact disc (CD) ROM (CD-ROM) or another optical disc storage, an optical disc storage (including a CD, a laser disc, an optical disc, a DIGITAL VERSATILE DISC (DVD), a BLU-RAY disc, and the like), a disk storage medium or another magnetic storage device, or any other medium that can be configured to carry or store expected program code in a form of instructions or a data structure and that can be accessed by a computer. However, the memory is not limited thereto. The memory 703 may exist independently, and is connected to the processor 701 by the communication bus 702. The memory 703 may be alternatively integrated with the processor 701.

Optionally, the memory 703 is configured to store program code or instructions for executing the technical solutions provided in embodiments of this application, and the processor 701 controls the execution. The processor 701 is configured to execute the program code or the instructions stored in the memory 703. The program code may include one or more software modules. Optionally, the processor 701 may store program code or instructions for executing the technical solutions provided in embodiments of this application. In this case, the processor 701 does not need to read the program code or the instructions from the memory 703.

The network interface 704 may be an apparatus such as a transceiver, and is configured to communicate with another device or a communication network. The communication network may be an Ethernet, a radio access network (RAN), a wireless local area network (WLAN), or the like. In this embodiment of this application, the network interface 704 may be configured to receive a packet sent by another node in a segment routing network, or may send a packet to another node in a segment routing network. The network interface 704 may be an Ethernet interface, a fast Ethernet (FE) interface, a gigabit Ethernet (GE) interface, or the like.

In an implementation, in an embodiment, the device 700 may include a plurality of processors, for example, the processor 701 and a processor 705 shown in FIG. 7. Each of the processors may be a single-core (single-CPU) processor, or may be a multi-core (multi-CPU) processor. The processor herein may be one or more devices, circuits, and/or processing cores configured to process data (for example, computer program instructions).

Figure 8:
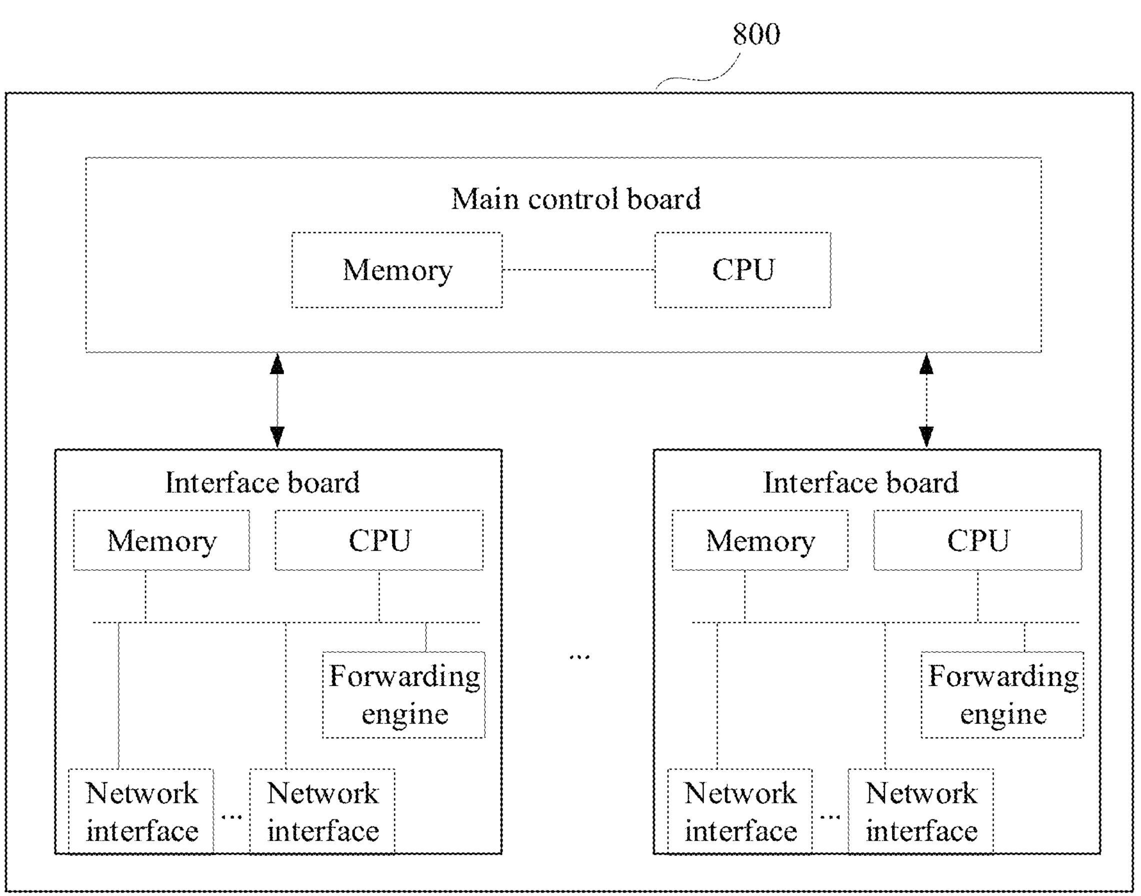
FIG. 8 is a schematic diagram of a structure of a device according to an embodiment of this application.

FIG. 8 is a schematic diagram of a structure of a device 800 according to an embodiment of this application. Each device in FIG. 2 may be implemented by using the device shown in FIG. 8. Refer to the schematic diagram of the structure of the device shown in FIG. 8. The device 800 includes a main control board and one or more interface boards. The main control board is communicatively connected to the interface board. The main control board is also referred to as a main processing unit (MPU) or a route processor card. The main control board includes a CPU and a memory. The main control board is responsible for controlling and managing components in the device 800, including route computation, and device management and maintenance functions. The interface board is also called a line processing unit (LPU) or a line card, and is configured to send and receive a packet. In some embodiments, the main control board communicates with the interface board through a bus, or the interface boards communicate with each other through a bus. In some embodiments, the interface boards communicate with each other through a switching board. In this case, the device 800 also includes the switching board. The switching board is communicatively connected to the main control board and the interface board. The switching board is configured to forward data between the interface boards. The switching board may also be referred to as a switch fabric unit (SFU). The interface board includes a CPU, a memory, a forwarding engine, and an interface card. The interface card may include one or more network interfaces. The network interface may be an Ethernet interface, an FE interface, a GE interface, or the like.

The CPU is communicatively connected to the memory, the forwarding engine, and the interface card. The memory is configured to store a forwarding table. The forwarding engine is configured to forward a received packet based on the forwarding table stored in the memory. If a destination address of the received packet is an IP address of the device 800, the forwarding engine sends the packet to the CPU of the main control board or the CPU of the interface board for processing. If the destination address of the received packet is not an IP address of the device 800, the forwarding engine searches the forwarding table based on the destination address. If a next hop and an outbound interface that correspond to the destination address are found from the forwarding table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may perform functions of the forwarding engine, such as implementing software forwarding based on a general-purpose CPU, so that no forwarding engine is required in the interface board. In some embodiments, the forwarding engine may be implemented by using an ASIC or a field-programmable gate array (FPGA). In some embodiments, the memory that stores the forwarding table may alternatively be integrated into the forwarding engine, and is used as a part of the forwarding engine.

An embodiment of this application further provides a chip system, including a processor. The processor is coupled to a memory. The memory is configured to store a program or instructions. When the program or the instructions are executed by the processor, the chip system implements the packet processing method performed by the first device in the embodiment shown in FIG. 2, or the chip system implements the packet processing method performed by the second device in the embodiment shown in FIG. 2.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a ROM. The memory and the processor may be integrated into a same chip, or may be separately disposed on different chips. A type of the memory and a manner of disposing the memory and the processor are not further limited in this application.

For example, the chip system may be an FPGA, may be an ASIC, may be a system on chip (SoC), may be a CPU, may be an NP, may be a digital signal processing circuit (or digital signal processor (DSP)), may be a microcontroller unit (MCU), or may be a programmable controller (or programmable logic device (PLD)), or another integrated chip.

It should be understood that the steps in the foregoing method embodiments may be completed by using a hardware integrated logic circuit or instructions in a form of software in the processor. The steps of the methods disclosed with reference to embodiments of this application may be directly performed by a hardware processor, or may be performed by a combination of hardware in the processor and a software module.

An embodiment of this application further provides a computer-readable storage medium, including instructions. When the instructions are run on a computer, the computer is enabled to perform the packet processing method that is provided in the foregoing method embodiments and that is performed by the first device, or the computer is enabled to perform the packet processing method that is provided in the foregoing method embodiments and that is performed by the second device.

An embodiment of this application further provides a computer program product including instructions. When the instructions are run on a computer, the computer is enabled to perform the packet processing method that is provided in the foregoing method embodiments and that is performed by the first device, or the computer is enabled to perform the packet processing method that is provided in the foregoing method embodiments and that is performed by the second device.

In the specification, claims, and accompanying drawings of this application, the terms “first”, “second”, “third”, “fourth”, and so on (if existent) are intended to distinguish between similar objects but do not necessarily indicate a specific order or sequence. It should be understood that the data termed in such a way are interchangeable in proper circumstances, so that embodiments of described herein can be implemented in other orders than the order illustrated or described herein. In addition, the terms “include” and “have” and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be obtained based on actual requirements to achieve the objectives of the solutions of embodiments.

In addition, module units in embodiments of this application may be integrated into one processing unit, each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of this application may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and beneficial effects of the present disclosure are further described in detail in the foregoing implementations. It should be understood that the foregoing descriptions are merely example implementations of the present disclosure.

In conclusion, the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method implemented by a first device, wherein the method comprises:

obtaining a forwarding entry comprising a match entry and an action entry corresponding to the match entry, wherein the match entry comprises a first identifier of one or more extension packet headers, and wherein the match entry is for defining an extension packet header of a processed packet;

receiving a first packet;

determining, based on the match entry, that the first packet comprises the extension packet header that matches the match entry; and processing the first packet based on the action entry in response to determining that the first packet comprises the extension packet header that matches the match entry.

2. The method of claim 1, wherein the match entry further comprises a first packet header information set, wherein the first packet header information set comprises the first identifier, wherein determining that the first packet comprises the extension packet header that matches the match entry comprises determining that a second packet header information set and the first packet header information set meet a match condition, and wherein the second packet header information set comprises the first identifier.

3. The method of claim 2, wherein determining that the second packet header information set and the first packet header information set meet the match condition comprises:

determining that the second packet header information set comprises first identifiers of all extension packet headers in the first packet header information set;

determining that the second packet header information set comprises the first identifier of any extension packet header in the first packet header information set; or determining that the second packet header information set does not comprise the first identifier of any extension packet header in the first packet header information set.

4. The method of claim 2, wherein the first packet further comprises a second extension packet header that comprises a field, wherein the second packet header information set comprises a second identifier of the second extension packet header and a third identifier of the field, and wherein determining that the second packet header information set and the first packet header information set meet the match condition comprises determining that the first packet header information set comprises the second identifier and the third identifier.

5. The method of claim 2, wherein the first packet further comprises a second extension packet header comprising a field, wherein the field has a first value, wherein the second packet header information set further comprises a second identifier of the second extension packet header, a third identifier of the field, and the first value, and wherein determining that the second packet header information set and the first packet header information set meet the match condition comprises determining that the first packet header information set comprises the second identifier, the third identifier, and the first value.

6. The method of claim 1, further comprising sending the first packet through a forwarding path comprising a device on the forwarding path that has a capability of processing the extension packet header.

7. The method of claim 6, further comprising:

encapsulating an outer packet header into the first packet to obtain a second packet, wherein a source address of the outer packet header is a first address of the device, wherein a first destination address of the outer packet header is a second destination address of the first packet or a second address of an Nth last hop network device of a destination device of the first packet, and wherein N is a positive integer; and sending the second packet through a forwarding path comprising a second device that cannot process the extension packet header.

8. The method of claim 7, wherein the outer packet header comprises a second identifier, and wherein the second identifier indicates that a second extension packet header comprised in the second packet does not need to be processed.

9. The method of claim 8, wherein the second identifier is located in a next header field of the outer packet header.

10. The method of claim 1, further comprising:

receiving, from a device, a notification message comprising a flow specification (FlowSpec) field, wherein the FlowSpec field comprises the action entry and the match entry; and generating, based on the notification message, the forwarding entry.

11. The method of claim 1, wherein the extension packet header comprises one or more of:

an Internet Protocol (IP) version 6 (IPv6) extension packet header;

a Multiprotocol Label Switching (MPLS) extension header; or an IP version 4 (IPv4) packet header comprising an IPV4 option.

12. A method, comprising:

generating a notification message comprising a match entry and an action entry corresponding to the match entry, wherein the match entry comprises a first identifier of one or more extension packet headers, and wherein the match entry is for defining an extension packet header of a processed packet; and sending the notification message for triggering processing, based on the action entry, a packet comprising an extension packet header that matches the match entry.

13. The method of claim 12, wherein the notification message enables generating a forwarding entry comprising a correspondence between the match entry and the action entry.

14. The method of claim 12, wherein the notification message is a Border Gateway Protocol (BGP) update message, and wherein the match entry is carried in a network layer reachability information (NLRI) field corresponding to a BGP flow specification (FlowSpec) of the notification message.

15. The method of claim 14, wherein the action entry is carried in the NLRI field or a route attribute information field of the notification message.

16. An apparatus in a first device, wherein the apparatus comprises:

one or more memories configured to store instructions; and at least one processor coupled to the one or more memories and configured to execute the instructions to cause the apparatus to:

obtain a forwarding entry comprising a match entry and an action entry corresponding to the match entry, wherein the match entry comprises a first identifier of one or more extension packet headers, and wherein the match entry is for defining an extension packet header of a processed packet;

receive a first packet;

determine, based on the match entry, that the first packet comprises the extension packet header that matches the match entry; and process, based on the action entry in response to determining that the first packet comprises the extension packet header that matches the match entry, the first packet.

17. The apparatus of claim 16, wherein the match entry further comprises a first packet header information set comprising the first identifier, and wherein the at least one processor is further configured to execute the instructions to cause the apparatus to determine that a second packet header information set and the first packet header information set meet a match condition, and wherein the second packet header information set comprises the first identifier.

18. The apparatus of claim 17, wherein the at least one processor is further configured to execute the instructions to cause the apparatus to:

determine that the second packet header information set comprises first identifiers of all extension packet headers in the first packet header information set;

determine that the second packet header information set comprises the first identifier of any extension packet header in the first packet header information set; or determine that the second packet header information set does not comprise the first identifier of any extension packet header in the first packet header information set.

19. An apparatus in a second device, wherein the apparatus comprises:

one or more memories configured to store instructions; and at least one processor coupled to the one or more memories and configured to execute the instructions to cause the apparatus to:

generate a notification message comprising a match entry and an action entry corresponding to the match entry, wherein the match entry comprises a first identifier of one or more extension packet headers, and wherein the match entry is for defining an extension packet header of a processed packet; and send, to a first device, the notification message for triggering processing, based on the action entry, a packet comprising an extension packet header that matches the match entry.

20. The apparatus of claim 19, wherein the notification message enables a first device to generate a forwarding entry comprising a correspondence between the match entry and the action entry.

* * * * *